US012057980B2

(12) United States Patent
Zewail et al.

(10) Patent No.: US 12,057,980 B2
(45) Date of Patent: Aug. 6, 2024

(54) CYCLIC PREFIX DISTRIBUTION

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Xiaoxia Zhang, San Diego, CA (US); Tao Luo, San Diego, CA (US); Srinivas Yerramalli, Hyderabad (IN); Zhifei Fan, San Diego, CA (US); Wooseok Nam, San Diego, CA (US); Sungwoo Park, San Diego, CA (US); Akula Reddy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 17/082,603

(22) Filed: Oct. 28, 2020

(65) Prior Publication Data

US 2021/0135918 A1 May 6, 2021

Related U.S. Application Data

(60) Provisional application No. 62/928,879, filed on Oct. 31, 2019.

(51) Int. Cl.
*H04L 27/26* (2006.01)
*H04L 5/00* (2006.01)
(Continued)

(52) U.S. Cl.
CPC ........ *H04L 27/2607* (2013.01); *H04L 5/0094* (2013.01); *H04L 27/26025* (2021.01);
(Continued)

(58) Field of Classification Search
CPC ............. H04L 27/2607; H04L 27/2678; H04L 27/2602; H04L 27/26025; H04L 1/0681;
(Continued)

(56) References Cited

U.S. PATENT DOCUMENTS

2013/0022090 A1    1/2013  Weng et al.
2017/0331658 A1*  11/2017  Chen ................. H04W 72/1263
(Continued)

FOREIGN PATENT DOCUMENTS

CN    109417529 A    3/2019
CN    109845163 A    6/2019
(Continued)

OTHER PUBLICATIONS

3GPP,"TS 1 36 211 v.11.7.0", Apr. 2017, pp. 1-128 (Year: 2017).*
International Search Report and Written Opinion—PCT/US2020/058011—ISA/EPO—Feb. 9, 2021.

*Primary Examiner* — Salvador E Rivas
(74) *Attorney, Agent, or Firm* — QUALCOMM Incorporated

(57) ABSTRACT

Methods, systems, and devices for wireless communications are described. A wireless device may identify, for an initial slot of a periodic interval, a number of symbols included in the initial slot and a length of cyclic prefixes used for the symbols included in the initial slot based on a subcarrier spacing that is configured for wireless communication. The length of a first set of cyclic prefixes may be based on a length of a cyclic prefix calculated for an initial symbol of the initial slot at the configured subcarrier spacing. The wireless device may perform communications based on the determined number of symbols and length of cyclic prefixes included in the initial slot. Performing communications may include allocating resources based on a length of the cyclic prefixes used for the symbols included in the initial slot.

30 Claims, 13 Drawing Sheets

(51) Int. Cl.
*H04W 56/00* (2009.01)
*H04W 72/0446* (2023.01)

(52) U.S. Cl.
CPC ...... *H04L 27/2666* (2013.01); *H04L 27/2678* (2013.01); *H04W 56/001* (2013.01); *H04W 72/0446* (2013.01); *H04L 27/2602* (2013.01)

(58) Field of Classification Search
CPC .......... H04L 27/2666; H04J 2203/0091; H04J 14/0276; H04W 56/001
See application file for complete search history.

(56) References Cited

U.S. PATENT DOCUMENTS

| | | | |
|---|---|---|---|
| 2018/0091267 A1* | 3/2018 | Kim .................. | H04L 27/26025 |
| 2018/0331870 A1 | 11/2018 | Sun et al. | |
| 2019/0245727 A1* | 8/2019 | Park .................... | H04L 27/2607 |
| 2019/0313408 A1* | 10/2019 | Majmundar ...... | H04W 72/0446 |
| 2019/0313432 A1* | 10/2019 | Belghoul ............. | H04W 76/15 |
| 2019/0327716 A1 | 10/2019 | Wang et al. | |
| 2020/0028726 A1* | 1/2020 | Karlsson ............... | H04L 5/0094 |
| 2020/0053782 A1* | 2/2020 | Zhang .................. | H04L 5/0053 |
| 2021/0297193 A1* | 9/2021 | Noh .................. | H04W 72/0446 |
| 2021/0377893 A1* | 12/2021 | Khoryaev ............. | H04L 5/0053 |
| 2022/0217544 A1* | 7/2022 | Lin .................. | H04W 74/0808 |

FOREIGN PATENT DOCUMENTS

| | | |
|---|---|---|
| WO | WO-2016022962 A1 | 2/2016 |
| WO | WO-2017196684 A1 | 11/2017 |

\* cited by examiner

CYCLIC PREFIX DISTRIBUTION

CROSS REFERENCE

The present application for patent claims the benefit of U.S. Provisional Patent Application No. 62/928,879 by ZEWAIL et al., entitled "CYCLIC PREFIX DISTRIBUTION," filed Oct. 31, 2019, assigned to the assignee hereof, and expressly incorporated by reference herein.

INTRODUCTION

The following relates generally to wireless communications and more specifically to modifying cyclic prefixes.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses for modifying cyclic prefixes.

A method of wireless communications at a device is described. The method may include determining a subcarrier spacing for performing wireless communications. The method may also include identifying, for an initial slot of a periodic interval, a number of symbols included in the initial slot, a first length of a first set of cyclic prefixes used for a first set of symbols of the initial slot and a second length of a second set of cyclic prefixes used for a second set of symbols of the initial slot, where the first length of the first set of cyclic prefixes is based on a length of a cyclic prefix calculated for an initial symbol of the initial slot. The method may also include communicating, using the initial slot, data based on the identified first set of cyclic prefixes and the identified second set of cyclic prefixes.

An apparatus for wireless communications is described. The apparatus may include a processor and memory coupled with the processor, the processor and memory configured to cause the apparatus to configure a subcarrier spacing for performing wireless communications. The processor and memory may be further configured to cause the apparatus to identify, for an initial slot of a periodic interval, a number of symbols included in the initial slot, a first length of a first set of cyclic prefixes used for a first set of symbols of the initial slot and a second length of a second set of cyclic prefixes used for a second set of symbols of the initial slot, where the first length of the first set of cyclic prefixes is based on a length of a cyclic prefix calculated for an initial symbol of the initial slot. The processor and memory may be further configured to cause the apparatus to communicate, using the initial slot, data based on the identified first set of cyclic prefixes and the identified second set of cyclic prefixes.

Another apparatus for wireless communications is described. The apparatus may include means for determining a subcarrier spacing for performing wireless communications. The apparatus may also include means for identifying, for an initial slot of a periodic interval, a number of symbols included in the initial slot, a first length of a first set of cyclic prefixes used for a first set of symbols of the initial slot and a second length of a second set of cyclic prefixes used for a second set of symbols of the initial slot, where the first length of the first set of cyclic prefixes is based on a length of a cyclic prefix calculated for an initial symbol of the initial slot. The apparatus may also include means for communicating, using the initial slot, data based on the identified first set of cyclic prefixes and the identified second set of cyclic prefixes.

A non-transitory computer-readable medium storing code for wireless communications is described. The code may include instructions executable by a processor to configure a subcarrier spacing for performing wireless communications. The instructions may also be executable to identify, for an initial slot of a periodic interval, a number of symbols included in the initial slot, a first length of a first set of cyclic prefixes used for a first set of symbols of the initial slot and a second length of a second set of cyclic prefixes used for a second set of symbols of the initial slot, where the first length of the first set of cyclic prefixes is based on a length of a cyclic prefix calculated for an initial symbol of the initial slot, where the calculated length of the cyclic prefix is different than the first length of the first set of cyclic prefixes and based on the subcarrier spacing. The instructions may also be executable to communicate, using the initial slot, data based on the identified first set of cyclic prefixes and the identified second set of cyclic prefixes.

In some examples of the method, apparatuses, and non-transitory computer-readable medium described herein, the calculated length of the cyclic prefix is different from the first length of the first set of cyclic prefixes and the calculated length is based at least in part on the subcarrier spacing.

Some examples of the method, apparatuses, and non-transitory computer-readable medium described herein may further include operations, features, means, or instructions for multiplexing a synchronization signal block with a symbol of the second set of symbols based on the second set of cyclic prefixes including the second length.

In some examples of the method, apparatuses, and non-transitory computer-readable medium described herein, the determining includes configuring the device with a subcarrier spacing for performing wireless communications.

Some examples of the method, apparatuses, and non-transitory computer-readable medium described herein may further include operations, features, means, or instructions for receiving an indication of a resource configuration that indicates the first length of the first set of cyclic prefixes, the second length of the second set of cyclic prefixes, and the number of symbols included in the initial slot.

Some examples of the method, apparatuses, and non-transitory computer-readable medium described herein may further include operations, features, means, or instructions for selecting a resource configuration based on the subcarrier spacing, where the resource configuration indicates the first length of the first set of cyclic prefixes for the initial slot and the second length of the second set of cyclic prefixes for the initial slot.

In some examples of the method, apparatuses, and non-transitory computer-readable medium described herein, the resource configuration indicates a third length of a third set of cyclic prefixes for a third set of symbols in a second set of slots of the periodic interval, where the second length of the second set of cyclic prefixes may be equivalent to the third length of the third set of cyclic prefixes.

Some examples of the method, apparatuses, and non-transitory computer-readable medium described herein may further include operations, features, means, or instructions for indicating the first length of the first set of cyclic prefixes and the second length of the second set of cyclic prefixes based on the subcarrier spacing, and where the indicating includes transmitting an indication of a resource configuration for the subcarrier spacing, the resource configuration indicating the first length of the first set of cyclic prefixes and the second length of the second set of cyclic prefixes.

Some examples of the method, apparatuses, and non-transitory computer-readable medium described herein may further include operations, features, means, or instructions for allocating communication resources to a UE based on the first length of the first set of cyclic prefixes, the second length of the second set of cyclic prefixes, a first symbol length of the first set of symbols, and a second symbol length the second set of symbols, where the communicating includes communicating the data over the allocated communication resources.

In some examples of the method, apparatuses, and non-transitory computer-readable medium described herein, a size of a resource allocation unit may be based on a first relationship between the first length and the first symbol length and a second relationship between the second length and the second symbol length.

In some examples of the method, apparatuses, and non-transitory computer-readable medium described herein, the size of the resource allocation unit may be further based on a size of a resource block.

In some examples of the method, apparatuses, and non-transitory computer-readable medium described herein, the resource allocation unit includes a first number of resource elements, where allocating the communication resources includes allocating a number of resource blocks that includes a second number of resource elements that may be an integer multiple of the first number of resource elements.

In some examples of the method, apparatuses, and non-transitory computer-readable medium described herein, a size of a resource allocation unit may be based on a half of a greater of a first quotient of dividing the first symbol length by a first greatest common factor of the first length and the first symbol length, and a second quotient of dividing the second symbol length by a second greatest common factor of the second length and the second symbol length.

Some examples of the method, apparatuses, and non-transitory computer-readable medium described herein may further include operations, features, means, or instructions for identifying the periodic interval including the initial slot and a second set of slots, identifying, for the second set of slots, a third length of a third set of cyclic prefixes used for a third set of symbols, and identifying a first symbol length of the first set of symbols, a second symbol length of the second set of symbols, and a third symbol length of the third set of symbols, where the first symbol length, the second symbol length, and the third symbol length may be equivalent to a symbol length.

In some examples of the method, apparatuses, and non-transitory computer-readable medium described herein, the calculated length of the cyclic prefix may include operations, features, means, or instructions for identifying the initial slot includes an additional symbol relative to the second set of slots based on the calculated length of the cyclic prefix, identifying a fourth symbol length of the additional symbol that may be equivalent to the symbol length, and identifying a fourth length of an additional cyclic prefix used for the additional symbol.

In some examples of the method, apparatuses, and non-transitory computer-readable medium described herein, the first length of the first set of cyclic prefixes may be equivalent to a difference between the third length of the third set of cyclic prefixes and a quotient of dividing the fourth length of the additional cyclic prefix by a number of the first set of cyclic prefixes.

In some examples of the method, apparatuses, and non-transitory computer-readable medium described herein, the first set of cyclic prefixes includes a set of cyclic prefixes, the first length of the first set of cyclic prefixes may be evenly divided into four portions, and the second length of the second set of cyclic prefixes, the third length of the second set of cyclic prefixes, and the fourth length of the additional cyclic prefix may be equivalent.

In some examples of the method, apparatuses, and non-transitory computer-readable medium described herein, the calculated length of the cyclic prefix may include operations, features, means, or instructions for identifying the initial slot includes a set of additional symbols relative to the second set of slots based on the calculated length of the cyclic prefix, identifying a fourth symbol length of the set of additional symbols that may be equivalent to the symbol length, and identifying a fourth length of a fourth set of cyclic prefixes used for the set of additional symbols.

In some examples of the method, apparatuses, and non-transitory computer-readable medium described herein, the first length of the first set of cyclic prefixes may be equivalent to a difference between the third length of the third set of cyclic prefixes and a quotient of dividing a combined length of the fourth set of cyclic prefixes by a number of the first set of cyclic prefixes.

In some examples of the method, apparatuses, and non-transitory computer-readable medium described herein, the calculated length of the cyclic prefix may include operations, features, means, or instructions for identifying the initial slot includes a same number of symbols relative to the second set of slots based on the calculated length of the cyclic prefix.

In some examples of the method, apparatuses, and non-transitory computer-readable medium described herein, the first length of the first set of cyclic prefixes may be equivalent to a summation of the third length of the third set of cyclic prefixes and a quotient of dividing the half of the symbol length by the number of the first set of cyclic prefixes.

In some examples of the method, apparatuses, and non-transitory computer-readable medium described herein, the calculated length of the cyclic prefix may include operations, features, means, or instructions for identifying the initial slot includes an additional half symbol relative to the second set of slots based on the calculated length of the cyclic prefix, identifying a fourth symbol length of the additional half symbol that may be equivalent to half of the symbol length, and identifying a fourth length of an additional cyclic prefix used for the additional half symbol.

In some examples of the method, apparatuses, and non-transitory computer-readable medium described herein, the first length of the first set of cyclic prefixes may be equivalent to a difference between the third length of the third set of cyclic prefixes and a quotient of dividing the fourth length of the additional cyclic prefix by a number of the first set of cyclic prefixes.

In some examples of the method, apparatuses, and non-transitory computer-readable medium described herein, the calculated length of the cyclic prefix may include operations, features, means, or instructions for identifying the initial slot includes an additional symbol relative to the second set of slots based on the calculated length of the cyclic prefix, identifying a fourth symbol length of the additional symbol that may be equivalent to the symbol length, and identifying a fourth length of an additional cyclic prefix used for the additional symbol.

In some examples of the method, apparatuses, and non-transitory computer-readable medium described herein, a combined length of the first set of cyclic prefixes and the second set of cyclic prefixes may be equivalent to a difference between a product of multiplying the third length of the third set of cyclic prefixes by a combined number of the first set of cyclic prefixes and the second set of cyclic prefixes and a summation of the half of the symbol length and the fourth length of the additional cyclic prefix.

In some examples of the method, apparatuses, and non-transitory computer-readable medium described herein, the first length of the first set of cyclic prefixes and the second length of the second set of cyclic prefixes may be based on a distribution of the calculated length of the cyclic prefix across the initial slot.

In some examples of the method, apparatuses, and non-transitory computer-readable medium described herein, the device is a user equipment (UE) or a base station.

Some examples of the method, apparatuses, and non-transitory computer-readable medium described herein may further include operations, features, means, or instructions for configuring the device with a frequency band.

DETAILED DESCRIPTION

A wireless communications system may use cyclic prefixes to mitigate intersymbol interference—a cyclic prefix may contain a copy of an end portion of a symbol and be prepended to the symbol. In some cases, a length of an initial cyclic prefix (or a "special cyclic prefix") in an initial slot (or a "special slot") of a designated interval may be increased by an additional length to align a set of communication resources with a designated interval (e.g., a 0.5 millisecond interval). In some cases, as a subcarrier spacing increases, the additional length of the special cyclic prefix may remain the same while a length of symbols may decrease. In some examples, the additional length of the special cyclic prefix used for a subcarrier spacing may equal or exceed a half of a length of a symbol used for the subcarrier spacing (e.g., as the subcarrier spacing reaches and exceeds 960 KHz). Using a special cyclic prefix having a length that equals or exceeds a half of a symbol length may reduce a throughput of a wireless communications system.

To increase the throughput of a wireless communications system that uses a subcarrier spacing associated with a special cyclic prefix having a length that equals or exceeds half of a symbol length, a portion of the special cyclic prefix may be repurposed to carry data and/or to convey a reference signal. For example, a length of a special cyclic prefix for a particular subcarrier spacing may be modified (e.g., reduced) to support the addition of one or more additional full or partial symbols at a beginning or end of a special slot. In some cases, a length of one or more cyclic prefixes that occur after the special cyclic prefix may also be modified to support the addition of the one or more additional full or partial symbols.

In some examples, a device may select a preconfigured resource configuration for a particular subcarrier spacing that indicates a modified cyclic prefix length for a special cyclic prefix and at least one subsequent cyclic prefixes. The preconfigured resource configuration may also indicate a number of symbols included in an initial slot. In some cases, communication resources may be allocated based on the modified cyclic prefix lengths, original cyclic prefix lengths, and/or a size of a resource block. In some cases, synchronization signal (SS) blocks may be multiplexed with symbols that are prepended by cyclic prefixes having an original cyclic prefix length and not with cyclic prefixes having a modified cyclic prefix length.

Aspects of the disclosure are initially described in the context of a wireless communications system. Specific examples are then described of resource configurations and a process that support cyclic prefix distribution. Aspects of the disclosure are further illustrated by and described with reference to apparatus diagrams, system diagrams, and flowcharts that relate to cyclic prefix distribution.

Figure 1:
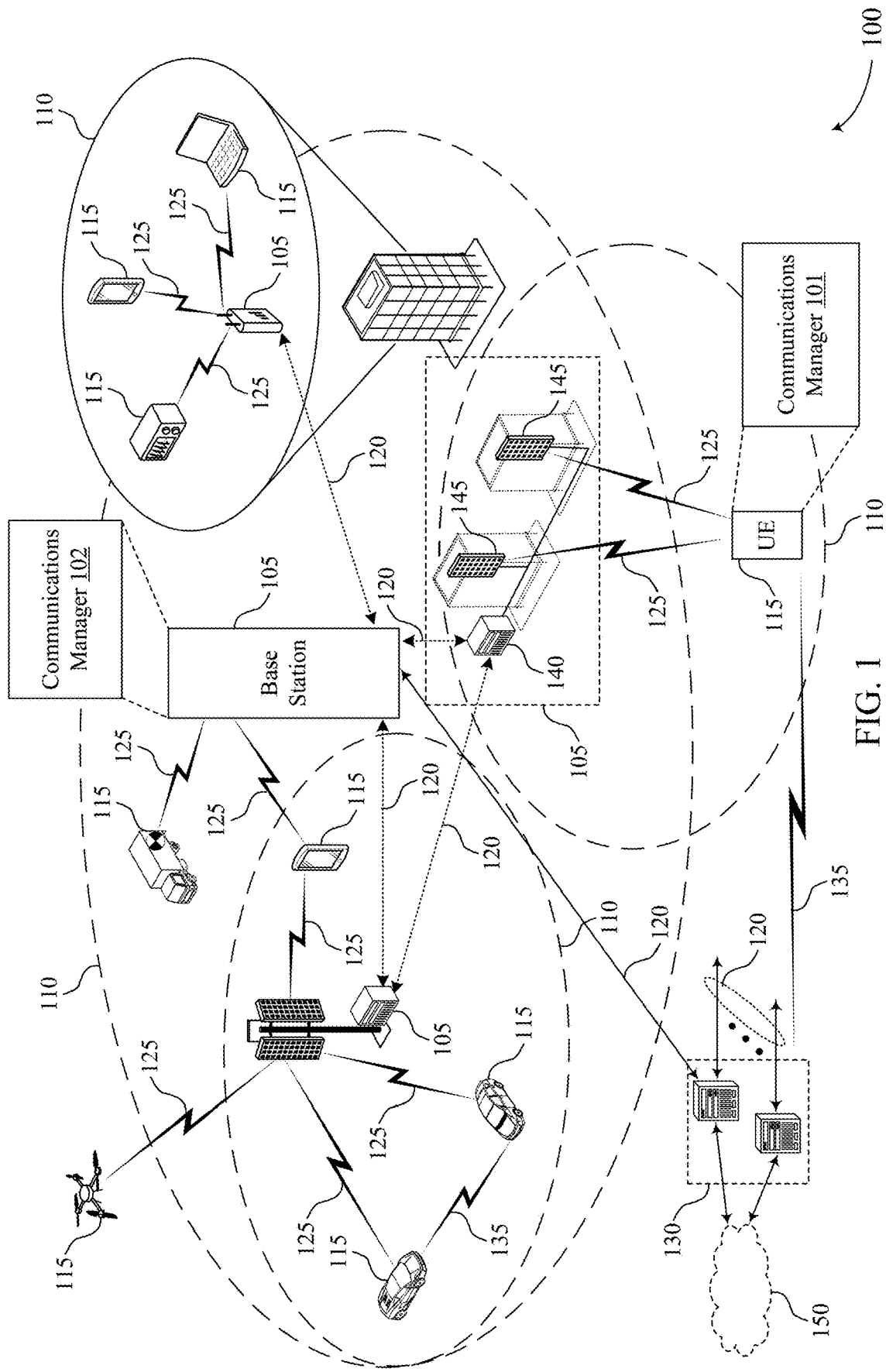
FIG. 1 illustrates an example of a wireless communications system that supports cyclic prefix distribution in accordance with one or more aspects of the present disclosure.

FIG. 1 illustrates an example of a wireless communications system that supports cyclic prefix distribution in accordance with one or more aspects of the present disclosure.

A wireless communications system 100 may include one or more base stations 105 (e.g., gNodeBs (gNBs), and/or radio heads (RHs)), one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. A UE 115 may communicate with the core network 130 through communication link 135.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Communication resources used by a wireless communications system 100 may be divided into time intervals of varying lengths, with each time interval being a multiple of a basic time unit (which may be referred to as k). In some cases, the length of the basic time unit may be a function of the subcarrier spacing (which may also be referred to using $\Delta f$) supported by the wireless communications system $$\left(\text{e.g., k may equal } \frac{1}{2,048 * \Delta f}\right).$$

In some examples, communication resources may be divided into radio frames. A radio frame may be further divided into subframes. A subframe may be further divided into slots. And a slot may be further divided into symbol periods that include a symbol and a cyclic prefix—cyclic prefixes may be prepended to each symbol to enable circular convolution. To ensure that the slots fill a 0.5 millisecond interval, a length of one of the cyclic prefixes in a slot may be extended relative to the other cyclic prefixes and symbol periods in the slot and other slots in the 0.5 millisecond interval while a length of the symbols may be held constant. Thus, a length of the corresponding one of the symbol periods and the corresponding slot may also increase. In some cases, the first symbol is referred to as a "special symbol," the corresponding first cyclic prefix is referred to as a "special cyclic prefix," and the corresponding first slot within the 0.5 millisecond interval is referred to as a "special slot."

In some examples—e.g., when the subcarrier spacing is equal to 15 KHz—radio frames may extend for 10 ms (which may also be represented as 307,200*k or 307,200 k), subframes may extend for 1 ms (or 30,720 k), and slots may extend for 0.5 milliseconds (or 15,360 k, where k≈32.6 nanoseconds). Thus, in some cases, two slots may be included in a subframe, and 10 subframes (and 20 slots) may be included in a radio frame. In some examples, symbols may extend 66.67 microseconds (or 2,048 k). Thus, a slot may include seven (7) symbols and seven (7) cyclic prefixes. In some examples, to fill the length of a 0.5 millisecond interval, the length of the first cyclic prefix in a slot (e.g., symbol 0 and symbol 7 in a subframe) may extend ~5.20 microseconds (or 160 k=144 k+16 k) and the length of the remaining cyclic prefixes may extend ~4.68 microseconds (or 144 k). Thus, the first cyclic prefix may extend an additional ~0.52 microseconds relative to the remaining cyclic prefixes. It is to be understood that references to specific values, parameters, or formulae described herein are provided for illustrative purposes, and different values, parameters, or formulae not specifically referred to herein may be used.

In some cases, a wireless communications system 100 may use multiple subcarrier spacings or a different subcarrier spacing than another wireless communications system. When a subcarrier spacing of 30 KHz is used, a slot may extend for 0.25 milliseconds (or 15,360k, where k≈16.3 nanoseconds). Thus, a subframe may include four slots and a 0.5 millisecond interval may include two slots. For a larger subcarrier spacing, a cyclic prefix that is larger in proportion to the remaining cyclic prefixes in a subframe (as compared to a smaller subcarrier spacing) may be prepended to a special symbol of a special slot within a 0.5 millisecond interval. For example, in order to fill the length of a 0.5 millisecond interval when a 30 KHz subcarrier spacing is used, a length of the first cyclic prefix in every two slots (e.g., symbol 0 in a first slot and symbol 0 in a third slot) may extend ~2.86 microseconds (or 176 k=144 k+32 k) and the length of the remaining cyclic prefixes may extend ~2.34 microseconds (or 144 k). Thus, the first cyclic prefix may extend an additional ~0.52 microseconds relative to the remaining cyclic prefixes.

In some cases, the length of a special cyclic prefix for a particular subcarrier spacing may be determined based on the following formula:

$$L_{CP'} = 144\left(\frac{1}{2,048*\Delta f}\right) + \left(16*\frac{\Delta f}{15,000}\right)\left(\frac{1}{2,048*\Delta f}\right) \Rightarrow 144 \text{ k} + \left(16*\frac{\Delta f}{15,000}\right)\frac{1}{2,048*\Delta f} \Rightarrow 144 \text{ k} + \frac{16}{30,720,000} \Rightarrow 144 \text{ k} + \sim.52 \text{ μs}.$$

Accordingly, as a subcarrier spacing used by a wireless communications system 100 increases, the additional length of the special cyclic prefix relative to the remaining cyclic prefixes may remain constant while a length of symbols decreases. In some cases, the additional length of the special cyclic prefix may exceed a half of a length of a symbol. For example, when a subcarrier spacing of 960 KHz is used, a length of a symbol may be equal to 2,048 k and a length of a special cyclic prefix may be equal to $$1,168 \text{ k} = \left(144 \text{ k} + \left(16*\frac{960,000}{15,000}\right)\right) \text{k} \Rightarrow 144 \text{ k} + 1,024 \text{ k}.$$

When a subcarrier spacing of 1,920 KHz is used, a length of a symbol may be equal to 2,048 k and a length of a special cyclic prefix may be equal to $$2,192 \text{ k} = 144 \text{ k} + \left(16*\frac{1,920,000}{15,000}\right) \text{k} \Rightarrow 144 \text{ k} + 2,048 \text{ k}.$$

And when a subcarrier spacing of 3,840 KHz is used, a length of a symbol may be equal to 2,048 k and a length of a special cyclic prefix may be equal to $$4,240 \text{ k} = 144 \text{ k} + \left(16*\frac{3,840,000}{15,000}\right) \text{k} \Rightarrow 144 \text{ k} + 4,096 \text{ k}.$$

Using a special cyclic prefix that includes an additional length of ~0.52 microseconds across all subcarrier spacings may reduce a throughput of a wireless communications system 100.

To increase the throughput of a wireless communications system 100 that uses a subcarrier spacing associated with a length of special cyclic prefix that exceeds half of a symbol length, a portion of the special cyclic prefix length may be repurposed to carry data and/or to convey a reference signal.

For example, a portion of communication resources reserved for the special cyclic prefix may be redistributed to an additional full or partial symbol period(s) that are added at the beginning or end of a special slot. Thus, a special slot may include additional full or partial symbol(s) relative to the other slots in a resource configuration. In some cases, to support the additional full or partial symbol(s), a length of a special prefix and/or other cyclic prefixes in a special slot may be modified.

In some cases, a number of samples to take in a symbol period is selected for a wireless communications system 100 based on a length of cyclic prefixes in a resource configuration. For example, a ratio between a number of samples used for a cyclic prefix of a symbol period and a number of samples used for a symbol period may be proportional to a ratio between a length of a cyclic prefix and a length of a symbol. For instance, for a cyclic prefix having a length of 160 k and a symbol having a length of 2,048 k—corresponding to a ratio of 160 k: 2,048 k, which simplifies to 5 k: 64 k—a symbol period may be sampled 32 times, where five (5) of the samples correspond to the cyclic prefix. In some cases, the symbol period may be oversampled—e.g., at twice the rate. Similarly, for a cyclic prefix having a length of 144 k and a symbol having a length of 2,048 k—corresponding to a ratio of 144 k: 2,048 k, which simplifies to 18 k: 256 k—a symbol period may be sampled 128 times, where 18 of the samples correspond to the cyclic prefix. In some cases, a number of samples to take in a symbol period is limited to a set of Hamming numbers derived from any combination of $2^i3^j5^k$, where i,j,k are integers that are greater than or equal to zero.

In some cases, a base station communications manager 102 at a base station 105 may use a resource configuration for a subcarrier spacing that uses a first set of cyclic prefixes having a first length (e.g., 72 k) and a second set of cyclic prefixes having a second length (e.g., 144 k)—e.g., based on using a resource configuration that includes special slots having an additional symbol relative to other slots. In some examples, a number of samples to take in a symbol period selected by the base station communications manager 102 is further based on a first ratio between the first cyclic prefix and symbols in the resource configuration and a second ratio between the second cyclic prefix and symbols in the resource configuration. For instance, for a first ratio associated with the first set of cyclic prefixes and a second ratio associated with the second set of cyclic prefixes, the number of samples for a symbol period may be selected based on the greatest common factor of the simplified symbol lengths and a type of pulse shaping filter used by the base station communications manager 102. For example, if a pulse shaping filter that oversamples a signal by two is used, a number of samples that is equivalent to a greatest common factor of the simplified symbol lengths and a type of pulse shaping filter divided by two may be selected—e.g., for a first simplified ratio of 9 k: 256 k associated with the first set of cyclic prefixes and a second simplified ratio 18 k: 256 k associated with the second set of cyclic prefixes, a symbol period may be sampled 128 times. A UE communications manager 101 at UE 115 may similarly use a resource configuration for the subcarrier spacing that indicates a first length for a first set of cyclic prefixes and a second length for a second set of cyclic prefixes.

In some cases, a base station communications manager 102 allocates communication resources based on a length of cyclic prefixes in a resource configuration. That is, the base station communications manager 102 may allocate communication resources based on a number of times a symbol period is sampled where, as discussed above, the number of samples may be based on one or more ratios between cyclic prefixes and symbols used in a resource configuration. For example, if a number of samples taken in a symbol period is equivalent to 128 samples, a resource allocation unit may include 128 resource elements—a resource allocation unit may be associated with a minimum number of communication resources used to convey a transmission. In some cases, a number of resource allocation units allocated by a wireless communications system 100 is limited to a set of Hamming numbers derived from any combination of $2^i 3^j 5^k$, where i,j,k are integers that are greater than or equal to zero.

In some cases, a base station communications manager 102 further allocates communication resources based on a size of a resource block—in some examples, a resource block may include twelve (12) subcarriers and seven (7) symbols (or 84 resource elements). In some cases, a wireless communications system 100 may allocate communications resources to achieve a full resource block allocation—e.g., such that all of the communication resource in an integer number of resource blocks are allocated. In some examples, to achieve a full resource block allocation, the number of allocated resource elements may be equivalent to a least common multiple of the number of resource elements included in a resource allocation unit and a number of resource elements included in a resource block—e.g., for a first resource allocation unit including 128 resource elements and a resource block including 84 resource elements, a second resource allocation unit may be equivalent to 2,688 resource elements $$\left(\text{or } \frac{2{,}688}{84} \Rightarrow 32 \text{ resource blocks}\right).$$

In some cases, a number of resource allocation blocks allocated by the base station communications manager 102 is limited to a set of Hamming numbers derived from any combination of $2^i 3^j 5^k$, where i,j,k are integers that are greater than or equal to zero. A UE communications manager 101 may similarly determine a resource configuration based on lengths of cyclic prefixes and/or a size of a resource block.

In some cases, a base station communications manager 102 multiplexes SS blocks with one or more symbols based on a resource configuration indicated for a subcarrier spacing. For example, a base station communications manager 102 may multiplex SS blocks with symbols that are prepended with a cyclic prefix of a certain length (e.g., 144 k). In some cases, a base station 105 may refrain from multiplexing SS blocks with symbols that are prepended with a cyclic prefix having a modified length—e.g., a length different than 144 k. In other cases, a base station 105 may multiplex SS blocks with symbols that are prepended with a cyclic prefix having a modified length. A UE communications manager 101 may similarly receive SS blocks over symbols that are prepended with a cyclic prefix of a certain length. When SS blocks are multiplexed with symbols that are prepended with a cyclic prefix having a modified length, a UE may perform a blind detection of the SS block. By only multiplexing SS blocks with symbols that are prepended with a cyclic prefix having a certain length, SS blocks may be more easily detected.

Figure 2:
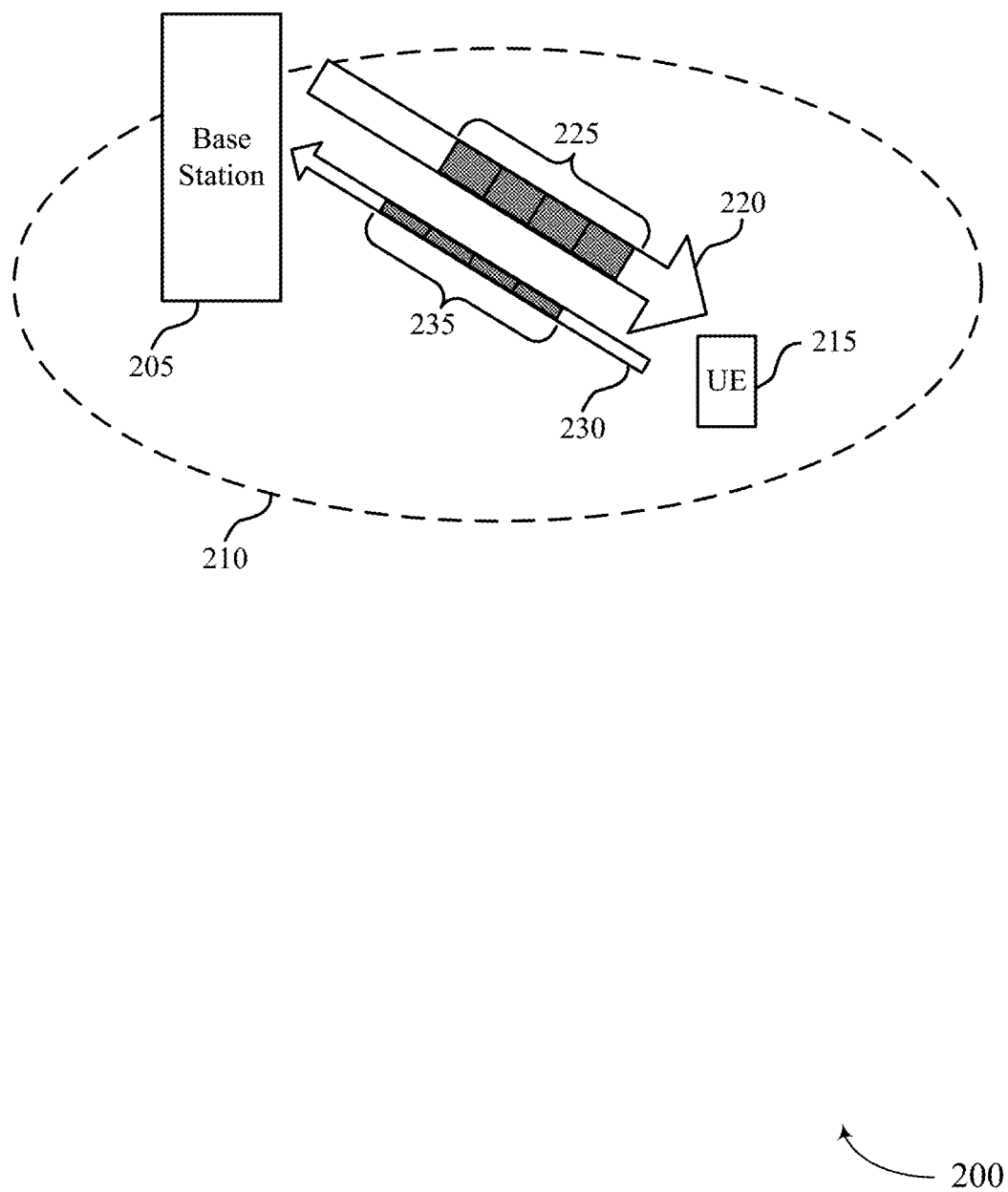
FIG. 2 illustrates an example of a wireless communications subsystem that supports cyclic prefix distribution in accordance with one or more aspects of the present disclosure.

FIG. 2 illustrates aspects of a wireless communications subsystem that supports cyclic prefix distribution in accordance with one or more aspects of the present disclosure.

Wireless communications subsystem 200 may include base station 205 and UE 215 which may be examples of a base station or UE described above with reference to FIG. 1. Base station 205 and UE 215 may communicate with one another via downlink 220 and uplink 230 within coverage area 210, as described above with reference to FIG. 1. It is to be understood that references to specific values, parameters, or formulae described in the below figures are provided for illustrative purposes, and different values, parameters, or formulae not specifically referred to herein may be used.

As discussed above and herein, as a subcarrier spacing used by a wireless communications system increases, an additional length of a special cyclic prefix may exceed a length of half of a symbol. To increase the throughput of a wireless communications system that uses a subcarrier spacing associated with a length of special cyclic prefix that exceeds half of a symbol length, a portion of the special cyclic prefix length may be repurposed to carry data and/or to convey a reference signal.

For example, a portion of communication resources reserved for the special cyclic prefix may be redistributed to an additional full or partial symbol period(s) that are added at the beginning or end of a special slot. Thus, a special slot may include additional full or partial symbol(s) relative to the other slots in a resource configuration. In some cases, to support the additional full or partial symbol(s), a length of a special prefix and/or other cyclic prefixes in a special slot may be modified.

In some examples—e.g., when a subcarrier spacing of 3,840 KHz is used—multiple symbols may be added to a special slot. Based on adding the multiple symbols to either the beginning or end of the special slot, a length of the special cyclic prefix and/or other cyclic prefixes in the special slot may be modified (e.g., reduced). For example, to support the addition of two symbols and two cyclic prefixes to a special slot, a length of the special cyclic prefix may first be reduced by a length that is equivalent to a combined length of both additional symbols—e.g., the removed length may be redistributed to the new symbols. In some cases, a length of the special cyclic prefix and the other cyclic prefixes in the special slot are equal to 144 k after the length of the cyclic prefix is reduced. Next, a length of the special cyclic prefix and at least one subsequent cyclic prefix may be reduced by an amount that is equivalent to a combined length of additional cyclic prefixes used for the additional symbols—i.e., a length of each of the special and at least one subsequent cyclic prefixes may be reduced by an amount that is equivalent to the length of the first additional cyclic prefix ($L_{CP,new1}$) plus the length of the second additional cyclic prefix ($L_{CP,new2}$) divided by the number of cyclic prefixes ($N_{CP}$) used to support the addition of the additional cyclic prefixes, which may also be represented as $$\frac{L_{CP,new1} + L_{CP,new2}}{N_{CP}}.$$

In some cases, a length of the cyclic prefixes in a slot may be reduced such that the remaining length is divisible by four—e.g., to support the use of a 512 k FFT. A resource configuration associated with adding additional symbols is discussed in more detail herein and at least with reference to FIG. 3.

In some examples—e.g., when a subcarrier spacing of 1,920 KHz is used—one symbol may be added to a special slot. Based on adding the symbol to either the beginning or end of the special slot, a length of the special cyclic prefix and/or other cyclic prefixes in the special slot may be modified (e.g., reduced). For example, to support the addition of one symbol and one cyclic prefix to a special slot, a length of the special cyclic prefix may first be reduced by a length that is equivalent to a length of the additional symbol—e.g., the removed length may be redistributed to the new symbol. In some cases, a length of the special cyclic prefix and the other cyclic prefixes in the special slot are equal to 144 k after the length of the cyclic prefix is reduced. Next, a length of the special cyclic prefix and at least one subsequent cyclic prefix may be reduced by an amount that is equivalent to a length of the additional cyclic prefix used for the additional symbol—e.g., a length of each of the special and at least one subsequent cyclic prefixes may be reduced by an amount that is equivalent to the length of the additional cyclic prefix ($L_{CP,new}$) divided by the number of cyclic prefixes ($N_{CP}$) used to support the addition of the additional cyclic prefix, which may also be represented as $$\frac{L_{CP,new}}{N_{CP}}.$$

In some cases, a length of the cyclic prefixes in a slot may be reduced such that the remaining length is divisible by four—e.g., to support the use of a 512 k FFT.

In another example—e.g., when a subcarrier spacing of 960 KHz is used—one symbol may be added to a special slot. Based on adding the symbol to either the beginning or end of the special slot, a length of the special cyclic prefix and/or other cyclic prefixes in the special slot may be modified (e.g., reduced). For example, to support the addition of one symbol and one cyclic prefix to a special slot, a length of the special cyclic prefix may first be reduced by a length that is equivalent to a portion of length of the additional symbol—i.e., the removed length may be redistributed to a portion of the new symbol. In some cases, a length of the special cyclic prefix and the other cyclic prefixes in the special slot are equal to 144 k after the length of the cyclic prefix is reduced. Next, a length of the special cyclic prefix and at least one subsequent cyclic prefix may be reduced by a first amount and a length of an additional set of subsequent cyclic prefixes may be reduced by a second amount such that the total reduced amount is equivalent to the combined length of the additional cyclic prefix used for the additional symbol and the remaining portion of the additional symbol—i.e., a combined length of each of the special and at least one subsequent cyclic prefixes and the second set of cyclic prefixes may be reduced by an amount that is equivalent to the length of the additional cyclic prefix ($L_{CP,new}$) plus the remaining portion of the symbol ($L_{SYM,new}$−1024 k), which may also be represented as $L_{CP,new}$+$L_{SYM,new}$−1024 k.

In some cases, a third set of subsequent cyclic prefixes may be reduced by a third amount such that the total reduced amount is equivalent to the combined length of the additional cyclic prefix used for the additional symbol and the remaining portion of the additional symbol. In some cases, a length of at least one cyclic prefix in the slot may be equivalent to 144 k after reducing the lengths of the cyclic prefixes to support the addition of the symbol. In some cases, the combined length of all of the cyclic prefixes in the special slot may be equivalent to 992 k after reducing the lengths of the cyclic prefixes to support the addition of the symbol. In some cases, a length of the cyclic prefixes in a slot may be reduced such that the remaining length is divisible by four—e.g., to support the use of a 512 k FFT. A resource configuration associated with adding an additional symbol is discussed in more detail herein and at least with reference to FIG. 4.

In some examples—e.g., when a subcarrier spacing of 960 KHz is used—one half symbol may be added to a special slot. Based on adding the half symbol to either the beginning or end of the special slot, a length of the special cyclic prefix and/or other cyclic prefixes in the special slot may be modified (e.g., reduced). For example, to support the addition of a half symbol and one cyclic prefix to a special slot, a length of the special cyclic prefix may first be reduced by a length that is equivalent to a length of the additional half symbol—i.e., the removed length may be redistributed to the new half symbol. In some cases, a length of the special cyclic prefix and the other cyclic prefixes in the special slot are equal to 144 k after the length of the cyclic prefix is reduced. Next, a length of the special cyclic prefix and at least one subsequent cyclic prefix may be reduced by an amount that is equivalent to a length of the additional cyclic prefix used for the additional half symbol—i.e., a length of each of the special and at least one subsequent cyclic prefix may be reduced by an amount that is equivalent to the length of the additional cyclic prefix ($L_{CP,14}$) divided by the number of cyclic prefixes ($N_{CP}$) used to support the addition of the additional cyclic prefix, which may also be represented as $$\frac{L_{CP,14}}{N_{CP}}.$$

In some cases, a length of the cyclic prefixes in a slot may be reduced such that the remaining length is divisible by four—e.g., to support the use of a 512 k FFT. A resource configuration associated with adding an additional half symbol is discussed in more detail herein and at least with reference to FIGS. 5A and 5B.

In some examples—e.g., when a subcarrier spacing of 960 KHz is used—no half or full symbol may be added to a special slot. In some cases, when no additional symbol is added, a length of the special cyclic prefix and/or other cyclic prefixes in the special slot may be modified. For example, to distribute the additional length of the special cyclic prefix, a length of the special cyclic prefix first be reduced by amount that is equivalent to a length of the additional portion of the special cyclic prefix. In some cases, a length of the special cyclic prefix and the other cyclic prefixes in the special slot are equal to 144 k after the length of the cyclic prefix is reduced. Next, a length of the special cyclic prefix and at least one subsequent cyclic prefix may be increased by a length that is equivalent to a length of the additional portion of the special cyclic prefix—e.g., a length of each of the special and at least one subsequent cyclic prefixes may be increased by an amount that is equivalent to the length of the additional portion of the special cyclic prefix ($L_{CP,spec}$−144 k) divided by the number of cyclic prefixes ($N_{CP}$) used to support the addition of the additional cyclic prefixes, or $$\frac{L_{CP,spec} - 144\,k}{N_{CP}}.$$

In some cases, a length of the cyclic prefixes in a slot may be increased such that the remaining length is divisible by four—e.g., to support the use of a 512 k FFT. A resource configuration associated with distributing an additional portion of a cyclic prefix without adding an additional half of full symbol is discussed in more detail herein and at least with reference to FIG. 6.

In some cases, base station 205 and UE 215 may communicate based at least in part on a subcarrier spacing configured by base station 205. In some cases, base station 205 selects a resource configuration for communicating with UE 215 based on the configured subcarrier spacing. For example, base station 205 may select a resource configuration having a special slot that includes an additional half of a symbol, an additional symbol, or additional symbols relative to other slots. In some cases, the selected resource configuration may include cyclic prefixes of varying lengths—e.g., to support an added half symbol or one or more full symbols. In some cases, base station 205 may indicate the selected resource configuration to UE 215—e.g., in PRACH signaling, RRC signaling, and/or control signaling. After selecting the resource configuration, base station 205 may perform downlink transmission 225 in accordance with the resource configuration, and UE 215 may receive downlink transmission 225 in accordance with the selected resource configuration. Similarly, UE 215 may perform, and base station 205 may receive, uplink transmission 235 in accordance with the selected resource configuration.

In other cases, base station 205 may redistribute communication resources reserved for a special cyclic prefix in accordance with one of the above resource configurations. That is, after identifying a subcarrier spacing and special cyclic prefix length for a communication, base station 205 may redistribute communication resources reserved for the special cyclic prefix to an added half or full symbol(s). In some cases, base station 205 may also redistribute communication resources reserved for subsequent cyclic prefixes to support the added half or full symbol(s). After redistributing the communication resources, base station 205 may perform downlink transmission 225 in accordance with the redistributed communication resources. In some cases, UE 215 may similarly redistribute communication resources reserved for a special cyclic prefix and/or subsequent cyclic prefixes and perform uplink transmission 235 to base station 205 in accordance with the redistributed communication resources.

In some cases, base station 205 may also allocate communication resources to UE 215 based on the selected resource configuration. That is, base station 205 may allocate communication resources based on the lengths of the cyclic prefixes and symbol periods included in the selected resource configuration, as discussed herein. In some cases, a number of resource elements included in a resource allocation unit may be selected from a sequence of numbers resulting from any combination of $2^i 3^j 5^k$, where i,j,k are integers that are greater than or equal to zero. In some cases, a number of resource allocation units allocated by a base station 205 may be selected from a sequence of numbers resulting from any combination of $2^i 3^j 5^k$, where i,j,k are integers that are greater than or equal to zero. In other cases, base station 205 may further allocate communication resources based on a size of a resource block. That is, base station 205 may allocate a number of resource allocation units that fills an integer number of resource blocks, as discussed herein. In some cases, a number of resource blocks allocated by a base station 205 may be selected from a sequence of numbers resulting from any combination of $2^i 3^j 5^k$, where i,j,k are integers that are greater than or equal to zero.

In some cases, base station 205 may multiplex symbols with SS blocks. In some cases, base station 205 multiplexes SS blocks with symbols that are prepended by a cyclic prefix of a certain length (e.g., 144 k). Thus, in some cases, base station 205 may multiplex SS blocks with one or more of a portion of symbols included in a special slot or may not multiplex SS blocks with any symbols in a special slot.

Figure 3:
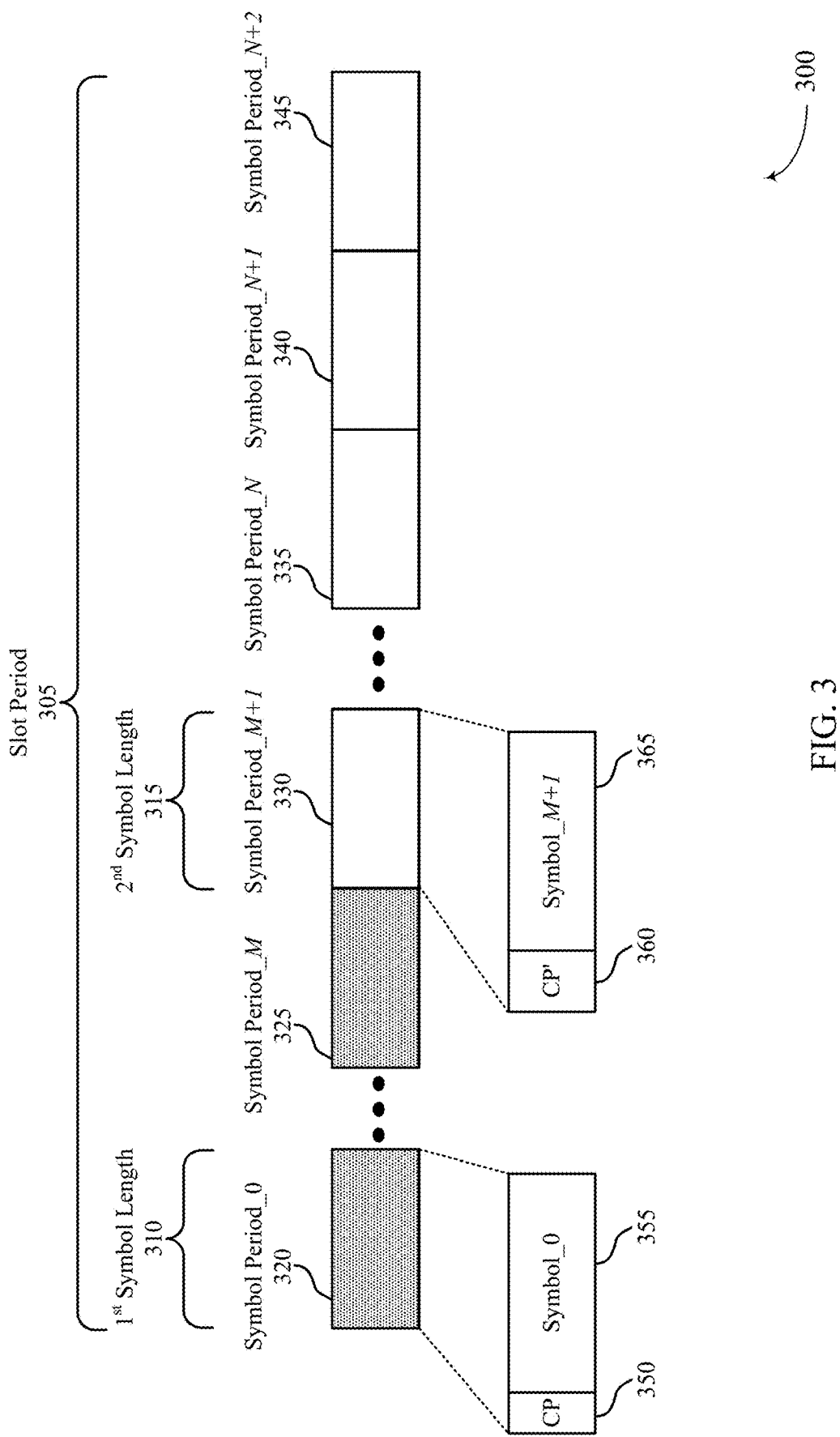
FIGS. 3 through 7 illustrates exemplary resource configurations that support cyclic prefix distribution in accordance with one or more aspects of the present disclosure.

FIG. 3 illustrates aspects of a resource configuration that supports cyclic prefix distribution in accordance with one or more aspects of the present disclosure.

Resource configuration 300 may indicate (e.g., to a base station and/or UE) how to map a data transmission (or how a data transmission is mapped) to communication resources for a subcarrier spacing (e.g., 3,840 KHz). In some cases, resource configuration 300 may indicate how many symbols are included in the data transmission (e.g., 16 symbols), a length of particular cyclic prefixes, a length of symbols (e.g., 2,048 k), a length of a slot (e.g., 30,720 k), and the like. It is to be understood that references to specific values, parameters, or formulae described herein are provided for illustrative purposes, and different values, parameters, or formulae not specifically referred to herein may be used. Resource configuration 300 may include slot period 305, first symbol length 310, and second symbol length 315.

Slot period 305 may indicate a duration of a slot for a particular subcarrier spacing. For example, for a subcarrier spacing of 3,840 KHz, a duration of slot period 305 may be equivalent to $$30{,}720\,k \Rightarrow 30{,}720 * \frac{1}{2{,}048 * 3{,}840{,}000} \approx 3.91 \text{ microseconds.}$$

When a subcarrier spacing of 3,840 KHz is used, 128 slots may be included in a designated interval (e.g., a 0.5 millisecond interval).

In some cases, slot period 305 may represent a resource configuration for a special slot—e.g., slot period 305 may be the first slot in the designated interval. In some cases, slot period 305 may be longer than the remaining slot periods in the designated interval. Slot period 305 may also indicate a number of symbols included in slot period 305, where the number of symbols may correspond to a number of symbol periods included in slot period 305. In some cases, slot period 305 includes 16 symbols (e.g., N+2=15) while other slot periods in the designated interval include 14 symbols (e.g., N=13).

First symbol length 310 may indicate a duration for transmitting a symbol and corresponding cyclic prefix for a configured subcarrier spacing during a symbol period. In some cases, first symbol length 310 represents a configuration of a special symbol period and at least one subsequent symbol periods. For example, first symbol length 310 may indicate a length of symbol period_0 320 through symbol period_M 325.

Second symbol length 315 may similarly indicate a duration for transmitting a symbol and corresponding cyclic prefix for the configured subcarrier spacing during a symbol period. In some cases, second symbol length 315 may represent a configuration of ordinary (or non-special) symbol periods. For example, second symbol length 315 may indicate a length of symbol period_M+1 330 through symbol period_N+2 345. In some cases, second symbol length 315 may also represent a configuration of the remaining symbol periods in the designated interval—i.e., the symbol periods in the other slot periods included in the designated interval may be configured in accordance with second symbol length 315.

Slot period 305 may include symbol period_0 320 through symbol period_N+2 345. Symbol period_0 320 may be the first symbol period in slot period 305 and may be referred to as a special symbol period. Symbol period_0 320 may have a length that is equivalent to a duration of first symbol length 310. In some cases, symbol period_0 320 may include a first cyclic prefix 350 and a first symbol 355.

First cyclic prefix 350 may be configured to mitigate intersymbol interference. In some cases, first cyclic prefix 350 may include a copy of an end portion of first symbol 355—e.g., to enable circular convolution techniques. In some cases, a length of first cyclic prefix 350 is based on a calculated length for first cyclic prefix 350 and a length of added symbols: symbol period_N+1 340 and symbol period_N+2 345. For example, a length of first cyclic prefix 350 may be based on reducing a calculated length for first cyclic prefix 350 to support the addition of the added symbols. In some cases, a length of first cyclic prefix 350 is further based on reducing a calculated length of the first cyclic prefix 350 and/or subsequent cyclic prefixes (e.g., through symbol period_M 325) to fully support the addition of the added symbols. First symbol 355 may be configured to convey information. In some cases, a length of first symbol 355 (e.g., 2,048 k) is the same as the length of the remaining symbols in slot period 305 and the symbols in the remaining slot periods in the designated interval.

Symbol period_M+1 330 may have a length that is equivalent to a duration of second symbol length 315. Symbol period_M+1 330 may be an ordinary symbol period and may similarly include a second cyclic prefix 360 and second symbol 365. Second cyclic prefix 360 may be similarly configured to mitigate intersymbol interference and to enable circular convolution techniques. In some cases, symbol periods_M+1 330 to symbol period_N+2 345 include cyclic prefixes of a same length as second cyclic prefix 360. Second symbol 365 may be configured to convey information. In some cases, a length of second symbol 365 may be equivalent to a length of first symbol 355.

Symbol period_N 335 may be the Nth symbol in slot period 305. In some cases, the remaining slot periods in the designated interval include N symbols. In some cases, slot period 305 includes two additional symbols (symbol period_N+1 340 and symbol period_N+2 345) relative to the remaining slot periods.

In some examples, a length of second cyclic prefix 360 is equivalent to 144 k. In some cases, the length of second cyclic prefix 360 is the same as the remaining cyclic prefixes in the remaining slot periods of a 0.5 millisecond slot that includes slot period 305 as the first slot. In some cases, SS blocks may be multiplexed with a symbol that is prepended by a cyclic prefix having the same length as second cyclic prefix 360. Also, a length of first cyclic prefix 350 may be based on a calculated length for first cyclic prefix 350 and the lengths of symbol period_N+1 340 and symbol period_N+2 345.

In some examples—e.g., if a subcarrier spacing of 3,840 KHz is used—a length for first cyclic prefix 350 may be calculated as being equivalent to 4,240 k, which may be further broken into a length of 144 k and an additional length 4,096 k. Also, a length for symbol period_N+1 340 may be equivalent to 2,192 k and a length for symbol period_N+2 345 may be equivalent to 2,192 k, where a length of the respective cyclic prefixes may be equivalent to 144 k and a length of the respective symbols may be equivalent to 2,048 k.

In some cases, the additional length of first cyclic prefix 350 may be redistributed to symbol period_N+1 340 and symbol period_N+2 345—i.e., the calculated length for first cyclic prefix 350 may be reduced to fit the additional symbol periods within slot period 305. After redistributing the additional length of first cyclic prefix 350, symbol period_0 320 through symbol period_N+2 345 may not fit within slot period 305—e.g., the symbol periods may have a length that exceeds the length of slot period by 288 k=4,384 k–4,096 k. Thus, an additional length of first cyclic prefix 350 and a length of at least one subsequent cyclic prefix (e.g., symbol period_M 325) may be reduced by a combined length of 288 k to fit the additional symbol periods within slot period 305. In some cases, the length of the remaining cyclic prefix for symbol period_0 320 and the cyclic prefixes calculated for the subsequent symbol periods up through and including symbol period_M 325 may be reduced by a same amount. For example, if M=2, the length of first cyclic prefix 350, the cyclic prefix used for symbol period_1, and the cyclic prefix used for symbol period_M 325 may be reduced by 96 k (i.e., 288 k/3), such that the length of first cyclic prefix 350 up through and including the Mth cyclic prefix may be equivalent to 48 k.

More generally, the remaining length of the first cyclic prefix 350 used for symbol period_0 320 and the cyclic prefixes used for the subsequent symbol periods up through and including symbol period_M 325 may be reduced by $$\frac{288\ k}{M+1}.$$

In an example where M=3, the length of first cyclic prefix 350 up through and including the Mth cyclic prefix may be equivalent to 72 k. In an example where M=5, the length of first cyclic prefix 350 up through and including the Mth cyclic prefix may be equivalent to 96 k. In an example where M=7, the length of first cyclic prefix 350 up through and including the Mth cyclic prefix may be equivalent to 108 k. In an example where M=8, the length of first cyclic prefix 350 up through and including the Mth cyclic prefix may be equivalent to 112 k. And in an example where M=11, the length of first cyclic prefix 350 up through and including the Mth cyclic prefix may be equivalent to 120 k.

In some cases, a length of cyclic prefixes used for symbol period_M+1 330 to symbol period_N+2 345 is equivalent to 144 k. By using cyclic prefixes having a length of 144 k, a symbol period may support control signaling such as SS block or reference signals. In some cases, the length of the cyclic prefixes included in symbol period_0 320 up through and including symbol period_M 325 may be equivalent to values that are multiples of four. By using cyclic prefixes having lengths that are multiples of four, a received signal may be scaled down to support a 512 k FFT.

In some cases, a base station may redistribute the lengths of the cyclic prefixes itself based on calculating a length of the additional symbols and performing an operation to redistribute a portion of communication resources reserved for the cyclic prefixes to the additional symbols. Similarly, a UE may determine a redistribution of resource based on calculating a length of additional symbols and a length for a special cyclic prefix. In other cases, the base station may select a preconfigured resource configuration that corresponds to resource configuration 300—that is, the base station may select a resource configuration that reflects a prior redistribution of the cyclic prefix calculated for a special symbol.

In some cases, a base station may allocate resources based on an arrangement of resource configuration 300 for a subcarrier spacing of 3,840 KHz. For example, the base station may allocate communication resources based on a length of first cyclic prefix 350, a length of second cyclic prefix 360, and a length of symbols within and outside of slot period 305. For example, the base station may select a number of samples for a symbol period based on a first ratio between a length of first cyclic prefix 350 and a symbol and a second ratio between a length of second cyclic prefix 360 and a symbol. That is, the base station may select a number of samples based on a greatest common factor of a simplified version of the first ratio and the second ratio. In some cases, the selected number of samples may correspond to a number of resource elements included in a resource allocation unit. In some cases, the selected number of samples and the number of resources included in the resource allocation unit may be selected from a sequence of numbers derived from calculating $2^i 3^j 5^k$, where i,j,k are integers that are greater than or equal to zero. In some cases, a base station may further allocate communication resources in an integer multiple (which may be represented as X) of resource allocation units, where X is derived from calculating $2^i 3^j 5^k$, where i,j,k are integers that are greater than or equal to zero. By selecting a number of samples based on a length of the cyclic prefixes as well as a number of samples and resource elements selecting numbers from this sequence, a low complexity DFT may be utilized.

In some cases, the base station may further allocate communication resources based on a number of resource elements in a resource block. For example, the base station may allocate communication resources that include a number of resource elements that is equivalent to a greatest common multiple of the resource elements included in the resource allocation unit and the number of resource elements included in the resource block. By selecting a number of resource elements that is equivalent to a greatest common multiple of the number of resource elements included in the resource allocation unit and a resource allocation block, a base station may ensure that a resource allocation fills an integer number of resource blocks. In some cases, the number of resource blocks included in a resource allocation may be selected from a sequence of numbers derived from calculating $2^i 3^j 5^k$, where i,j,k are integers that are greater than or equal to zero. By selecting a number of resource blocks in accordance with this sequence, a low complexity DFT may be utilized.

In some examples—e.g., if M equals 2, first cyclic prefix 350 equals 48 k, and second cyclic prefix 360 equals 144 k—a simplified ratio between a number of samples used for a cyclic prefix and a number of samples for first symbol period_0 320 equals 3:128, and a simplified between a number of samples used for a cyclic prefix and a number of samples for symbol period_M+1 330 equals 9:128. Thus, with an oversampling rate of 2, 64 samples may be taken for the symbol periods in slot period 305 and a resource allocation unit may include 64 resource elements. In some cases, a base station may allocate communication resources in accordance with the resource allocation unit. In some cases, a base station may allocate communication resources in an integer multiple (which may be represented as X) of resource allocation units, where X is derived from calculating $2^i 3^j 5^k$, where i,j,k are integers that are greater than or equal to zero. In other cases, a base station may allocate communication resources by selecting a number of resource blocks that include an integer number of the resource allocation unit—e.g., by computing the greatest common multiple of the number of resource elements in the resource block and the number of resource elements in the resource allocation unit divided by the number of resource elements in the resource block. For example, the base station may allocate communication resources in an integer multiple (which may be represented as Y) of 16

$$\left(\text{i.e., } \frac{LCM(12,64)}{12}\right)$$

resource blocks, where Y is derived from calculating $2^i 3^j 5^k$, where i,j,k are integers that are greater than or equal to zero.

In some examples—e.g., if M equals 3 (i.e., if symbol period_M is the third symbol period), first cyclic prefix 350 equals 72 k, and second cyclic prefix 360 equals 144 k—a simplified ratio between a number of samples used for a cyclic prefix and a number of samples for first symbol period_0 320 equals 9:256, and a simplified between a number of samples used for a cyclic prefix and a number of samples for symbol period_M+1 330 equals 9:128. Thus, with an oversampling rate of 2, 128 samples may be taken for the symbol periods in slot period 305 and a resource allocation unit may include 128 resource elements. In some cases, a base station may allocate communication resources in X resource allocation units. In other cases, a base station may allocate communication resources in Y of 32

$$\left(\text{i.e., } \frac{LCM(12,128)}{12}\right)$$

resource blocks.

In some examples—e.g., if M equals 5, first cyclic prefix 350 equals 96 k, and second cyclic prefix 360 equals 144 k—a simplified ratio between a number of samples used for a cyclic prefix and a number of samples for first symbol period_0 320 equals 3:64, and a simplified between a number of samples used for a cyclic prefix and a number of samples for symbol period_M+1 330 equals 9:128. Thus, with an oversampling rate of 2, 64 samples may be taken for the symbol periods in slot period 305 and a resource allocation unit may include 64 resource elements. In some cases, a base station may allocate communication resources in X resource allocation units. In other cases, a base station may allocate communication resources in Y of 16

$$\left(\text{i.e., } \frac{LCM(12,64)}{12}\right)$$

resource blocks.

In some examples—e.g., if M equals 7, first cyclic prefix 350 equals 108 k, and second cyclic prefix 360 equals 144 k—a simplified ratio between a number of samples used for a cyclic prefix and a number of samples for first symbol period_0 320 equals 27:512, and a simplified between a number of samples used for a cyclic prefix and a number of samples for symbol period_M+1 330 equals 9:128. Thus, with an oversampling rate of 2, 256 samples may be taken for the symbol periods in slot period 305 and a resource allocation unit may include 256 resource elements. In some cases, a base station may allocate communication resources in X resource allocation units. In other cases, a base station may allocate communication resources in Y of 64

$$\left(\text{i.e., } \frac{LCM(12,256)}{12}\right)$$

resource blocks.

In some examples—e.g., if M equals 8, first cyclic prefix 350 equals 112 k, and second cyclic prefix 360 equals 144 k—a simplified ratio between a number of samples used for a cyclic prefix and a number of samples for first symbol period_0 320 equals 7:128, and a simplified between a number of samples used for a cyclic prefix and a number of samples for symbol period_M+1 330 equals 9:128. Thus, with an oversampling rate of 2, 64 samples may be taken for the symbol periods in slot period 305 and a resource allocation unit may include 64 resource elements. In some cases, a base station may allocate communication resources in X resource allocation units. In other cases, a base station may allocate communication resources in Y of 16

$$\left(\text{i.e., } \frac{LCM(12,64)}{12}\right)$$

resource blocks.

In some examples—e.g., if M equals 11, first cyclic prefix 350 equals 120 k, and second cyclic prefix 360 equals 144 k—a simplified ratio between a number of samples used for a cyclic prefix and a number of samples for first symbol period_0 320 equals 15:256, and a simplified between a number of samples used for a cyclic prefix and a number of samples for symbol period_M+1 330 equals 9:128. Thus, with an oversampling rate of 2, 128 samples may be taken for the symbol periods in slot period 305 and a resource allocation unit may include 128 resource elements. In some cases, a base station may allocate communication resources in X resource allocation units. In other cases, a base station may allocate communication resources in Y of 32

$$\left(\text{i.e., } \frac{LCM(12,128)}{12}\right)$$

resource blocks.

Table 1 shows example resource allocations if M=2, 5, or 8, where 70% of a bandwidth (e.g., 540 MHz, 1,080 MHz, or 2,160 MHz) may be occupied. As shown in Table 1, if a base station allocates resources to fill an integer number of resource blocks, the available resource allocations may be limited to the instances where Y is equal to 1 or 2.

TABLE 1

| X | Y | Number of RBs | Bandwidth (MHz) |
|---|---|---|---|
| 1 | N/A | 5⅓ | 245.8 |
| 2 | N/A | 10⅔ | 491.5 |
| 3 | 1 | 16 | 737.3 |
| 4 | N/A | 21⅓ | 983.04 |
| 5 | N/A | 26⅔ | 1228.8 |
| 6 | 2 | 32 | 1474.6 |

Table 2 shows examples resource allocations if M=3 or 11, where 70% of a bandwidth (e.g., 540 MHz, 1,080 MHz, or 2,160 MHz) may be occupied. As shown in Table 2, if a base station allocates resources to fill an integer number of resource blocks, the available resource allocations may be limited to the instances where Y is equal to 1.

TABLE 2

| X | Y | Number of RBs | Bandwidth (MHz) |
|---|---|---|---|
| 1 | N/A | 10⅔ | 491.5 |
| 2 | N/A | 21⅓ | 983.04 |
| 3 | 1 | 32 | 1474.6 |

Table 3 shows example resource allocations if M=7, where 70% of a bandwidth (e.g., 540 MHz, 1,080 MHz, or 2,160 MHz) may be occupied. As shown in Table 2, if a base station allocates resources to fill an integer number of resource blocks, the base station may be prevented from using the resource allocation associated with M=8.

TABLE 3

| X | Y | Number of RBs | Bandwidth (MHz) |
|---|---|---|---|
| 1 | N/A | 21⅓ | 983.04 |

In some cases, a base station multiplexes SS blocks with symbols in a portion of the symbol periods included in slot period 305. For example, the base station may multiplex SS blocks with symbols in symbol period_M+1 330 through symbol period_N+2 345 based on a length of the cyclic prefixes included in those symbol periods. For example, the base station may multiple SS blocks with symbols in symbol periods_M+1 330 to symbol periods_N+2 345 based on a length of second cyclic prefix 360 being equivalent to 144 k. In some cases, the base station may refrain from multiplexing the SS blocks with symbols in symbol period_0 320 through symbol period_M 325—e.g., based on a length of first cyclic prefix 350 being different than 144 k.

Although the above discussion of FIG. 3 discusses the addition of two symbol periods at an end of slot period 305, the above discussion and calculations may also apply if the two symbol periods are added at a beginning of slot period 305. That is, to support the addition of a first and second symbol period to a beginning of slot period 305, a length of first cyclic prefix 350 and M−1 subsequent cyclic prefixes may be reduced to support the addition of two symbol periods as discussed above—e.g., if M=3, a length of the first cyclic prefix 350, the second cyclic prefix, and the Mth cyclic prefix may be equivalent to 48 k. After reducing the length of the cyclic prefixes, the first and second symbol period may be added at a beginning of slot period 305.

Figure 4:
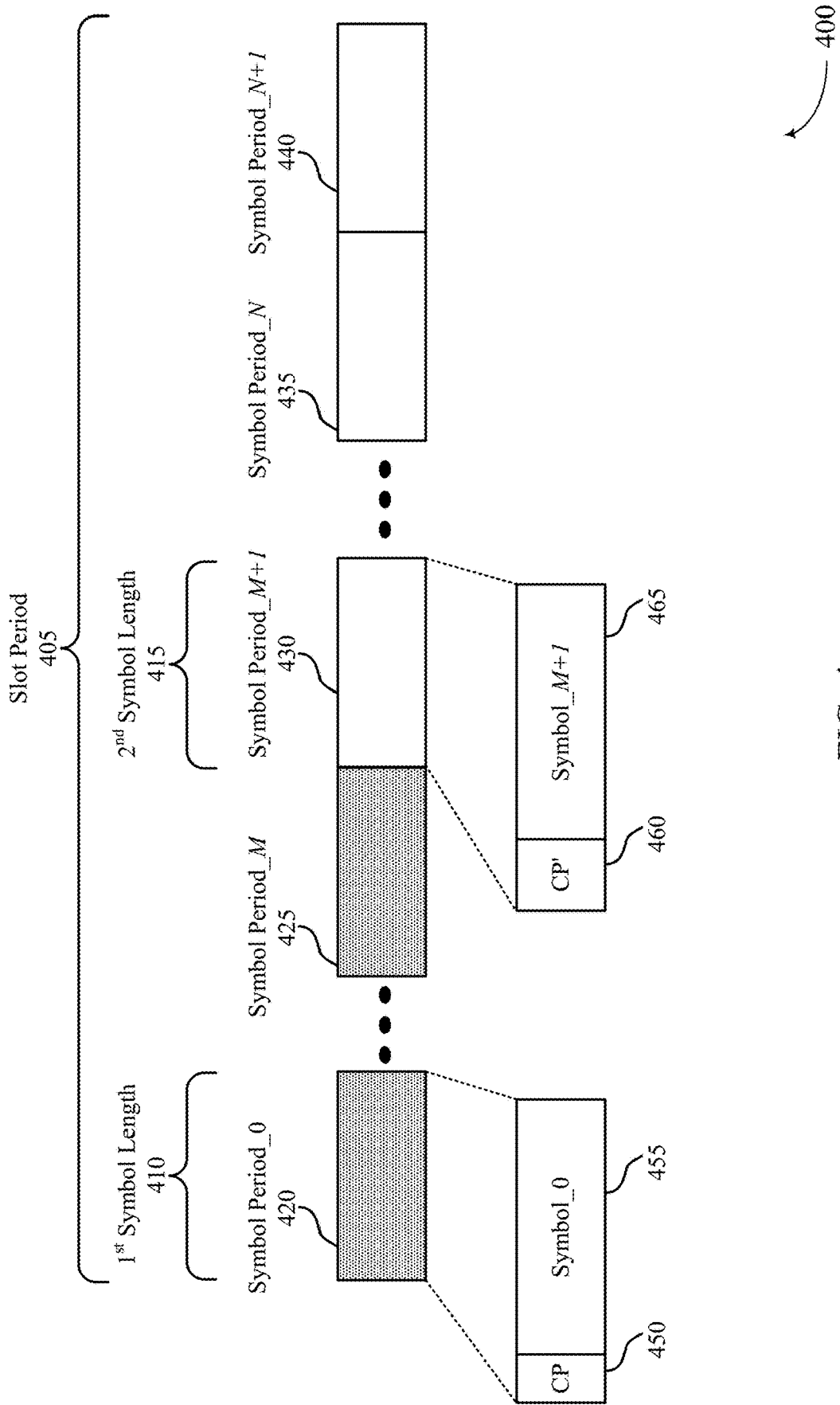

FIG. 4 illustrates aspects of a resource configuration that supports cyclic prefix distribution in accordance with one or more aspects of the present disclosure.

Resource configuration 400 may indicate (e.g., to a base station and/or UE) how to map a data transmission (or how a data transmission is mapped) to communication resources for a subcarrier spacing (e.g., 1,920 KHz). In some cases, resource configuration 400 may indicate how many symbols are included in the data transmission (e.g., 15 symbols), a length of particular cyclic prefixes, a length of symbols (e.g., 2,048 k), a length of a slot (e.g., 30,720 k), and the like. It is to be understood that references to specific values, parameters, or formulae described herein are provided for illustrative purposes, and different values, parameters, or formulae not specifically referred to herein may be used. Resource configuration 400 may include slot period 405, first symbol length 410, and second symbol length 415. Slot period 405 may indicate a duration of a slot for a particular subcarrier spacing. For example, for a subcarrier spacing of 1,920 KHz, a duration of slot period 405 may be equivalent to $$30{,}720 \text{ k} \Rightarrow 30{,}720 * \frac{1}{2{,}048 * 1{,}920{,}000} \approx 7.81 \text{ microseconds.}$$

When a subcarrier spacing of 1,920 KHz is used, 64 slots may be included in a designated interval (e.g., a 0.5 millisecond interval).

In some cases, slot period 405 may represent a resource configuration for a special slot—e.g., slot period 405 may be the first slot in the designated interval. In some cases, slot period 405 may be longer than the remaining slot periods in the designated interval. Slot period 405 may also indicate a number of symbols included in slot period 405, where the number of symbols may correspond to a number of symbol periods included in slot period 405. In some cases, slot period 405 includes 15 symbols (e.g., N+1=14) while other slot periods in the designated interval include 14 symbols (e.g., N=13).

First symbol length 410 may indicate a duration for transmitting a symbol and corresponding cyclic prefix for a configured subcarrier spacing during a symbol period. In some cases, first symbol length 410 represents a configuration of a special symbol period and at least one subsequent symbol periods. For example, first symbol length 410 may indicate a length of symbol period_0 420 through symbol period_M 425.

Second symbol length 415 may similarly indicate a duration for transmitting a symbol and corresponding cyclic prefix for the configured subcarrier spacing during a symbol period. In some cases, second symbol length 415 may represent a configuration of ordinary (or non-special) symbol periods. For example, second symbol length 415 may indicate a length of symbol period_M+1 430 through symbol period_N+1 440. In some cases, second symbol length 415 may also represent a configuration of the remaining symbol periods in the designated interval—i.e., the symbol periods in the other slot periods included in the designated interval may be configured in accordance with second symbol length 415. In some cases, SS blocks may be multiplexed with a symbol included in a symbol period that is constructed according to second symbol length 415.

Slot period 405 may include symbol period_0 420 through symbol period_N+1 440. Symbol period_0 420 may be the first symbol period in slot period 405 and may be referred to as a special symbol period. Symbol period_0 420 may have a length that is equivalent to a duration of first symbol length 410. In some cases, symbol period_0 420 may include a first cyclic prefix 450 and a first symbol 455.

First cyclic prefix 450 may be configured to mitigate intersymbol interference. In some cases, first cyclic prefix 450 may include a copy of an end portion of first symbol 455—e.g., to enable circular convolution techniques. In some cases, a length of first cyclic prefix 450 is based on a calculated length for first cyclic prefix 450 and a length of an added symbols (e.g., symbol period_N+1 440). For example, a length of first cyclic prefix 450 may be based on reducing a calculated length for first cyclic prefix 450 to support the addition of the added symbol. In some cases, a length of first cyclic prefix 450 is further based on reducing a calculated length of the first cyclic prefix 450 and/or subsequent cyclic prefixes (through symbol period_M 425) to fully support the addition of the added symbol. First symbol 455 may be configured to convey information. In some cases, a length of first symbol 455 (e.g., 2,048 k) is the same as the length of the remaining symbols in slot period 405 and the symbols in the remaining slot periods in the designated interval.

Symbol period_M+1 430 may have a length that is equivalent to a duration of second symbol length 415. Symbol period_M+1 430 may be an ordinary symbol period and may similarly include a second cyclic prefix 460 and second symbol 465. Second cyclic prefix 460 may be similarly configured to mitigate intersymbol interference and to enable circular convolution techniques. In some cases, symbol periods_M+1 430 to symbol period_N+2 445 include cyclic prefixes of a same length as second cyclic prefix 460. Second symbol 465 may be configured to convey information. In some cases, a length of second symbol 465 may be equivalent to a length of first symbol 455.

Symbol period_N 435 may be the Nth symbol in slot period 405. In some cases, the remaining slot periods in the designated interval include N symbols. In some cases, slot period 405 includes an additional symbol (symbol period_N+1 440) relative to the remaining slot periods.

In some examples, a length of second cyclic prefix 460 is equivalent to 144 k. In some cases, the length of second cyclic prefix 460 is the same as the remaining cyclic prefixes in the remaining slot periods of a 0.5 millisecond slot that includes slot period 405 as the first slot. In some cases, SS blocks may be multiplexed with a symbol that is prepended by a cyclic prefix having the same length as second cyclic prefix 460. Also, a length of first cyclic prefix 450 may be based on a calculated length for first cyclic prefix 450 and the lengths of symbol period_N+1 440.

In some examples—e.g., if a subcarrier spacing of 1,920 KHz is used—a length for first cyclic prefix 450 may be calculated as being equivalent to 2,192 k, which may be further broken into a length of 144 k and an additional length 2,048 k. Also, a length for symbol period_N+1 440 may be equivalent to 2,192 k, where a length of a corresponding cyclic prefix may be equivalent to 144 k and a length of a respective symbol may be equivalent to 2,048 k.

In some cases, the additional length of first cyclic prefix 450 may be redistributed to symbol period_N+1 440—i.e., the calculated length for first cyclic prefix 450 may be reduced to fit the additional symbol period within slot period 405. After redistributing the additional length of first cyclic prefix 450, symbol period_0 420 through symbol period_N+1 445 may not fit within slot period 405—e.g., the symbol periods may have a length that exceeds the length of slot period by 144 k=2,192 k−2,048 k. Thus, an additional length of first cyclic prefix 450 and a length of at least one subsequent cyclic prefix (e.g., symbol period_M 425) may be reduced by a combined length of 144 k to fit the additional symbol period within slot period 405. In some cases, the length of the remaining cyclic prefix for symbol period_0 420 and the cyclic prefixes calculated for the subsequent symbol periods up through and including symbol period_M 425 may be reduced by a same amount. For example, if M=1, the length of first cyclic prefix 450 and the cyclic prefix used for symbol period_M 425 may be reduced by 72 k (i.e., 144 k/2), such that the length of first cyclic prefix 450 up through and including the Mth cyclic prefix may be equivalent to 72 k.

More generally, the remaining length of first cyclic prefix 450 used for symbol period_0 420 and the cyclic prefixes for the subsequent cyclic prefixes up through and including symbol period_M 425 may be reduced by $$\frac{144\ k}{M+1}.$$

In an example where M=2, the length of first cyclic prefix 450 up through and including the Mth cyclic prefix may be equivalent to 96 k. In an example where M=5, the length of first cyclic prefix 450 up through and including the Mth cyclic prefix may be equivalent to 120 k. In an example where M=8, the length of first cyclic prefix 450 up through and including the Mth cyclic prefix may be equivalent to 128 k.

In some cases, a length of cyclic prefixes used for symbol period_M+1 430 to symbol period_N+1 440 is equivalent to 144 k. By using cyclic prefixes having a length of 144 k, a symbol period may support control signaling such as SS block or reference signals. In some cases, the length of the cyclic prefixes included in symbol period_0 420 up through and including symbol period_M 425 may be equivalent to values that are multiples of four. By using cyclic prefixes having lengths that are multiples of four, a received signal may be scaled down to support a 512 k FFT.

In some cases, a base station may redistribute the lengths of the cyclic prefixes itself based on calculating a length of the additional symbols and performing an operation to redistribute a portion of communication resources reserved for the cyclic prefixes to the additional symbols. Similarly, a UE may determine a redistribution of resource based on calculating a length of additional symbols and a length for a special cyclic prefix. In other cases, the base station may select a preconfigured resource configuration that corresponds to resource configuration 400—that is, the base station may select a resource configuration that reflects a prior redistribution of the cyclic prefix calculated for a special symbol.

In some cases, a base station may allocate resources based on an arrangement of resource configuration 400 for a subcarrier spacing of 1,920 KHz. For example, the base station may allocate communication resources based on a length of first cyclic prefix 450, a length of second cyclic prefix 460, and a length of symbols within and outside of slot period 405. For example, the base station may select a number of samples for a symbol period based on a first ratio between a length of first cyclic prefix 450 and a symbol and a second ratio between a length of second cyclic prefix 460 and a symbol. That is, the base station may select a number of samples based on a greatest common factor of a simplified version of the first ratio and the second ratio. In some cases, the selected number of samples may correspond to a number of resource elements included in a resource allocation unit. In some cases, the selected number of samples and the number of resources included in the resource allocation unit may be selected from a sequence of numbers derived from calculating $2^i 3^j 5^k$, where i,j,k are integers that are greater than or equal to zero. In some cases, a base station may further allocate communication resources in an integer multiple (which may be represented as X) of resource allocation units, where X is derived from calculating $2^i 3^j 5^k$, where i,j,k are integers that are greater than or equal to zero. By selecting a number of samples based on a length of the cyclic prefixes as well as a number of samples and resource elements selecting numbers from this sequence, a low complexity DFT may be utilized.

In some cases, the base station may further allocate communication resources based on a number of resource elements in a resource block. For example, the base station may allocate communication resources that include a number of resource elements that is equivalent to a greatest common multiple of the resource elements included in the resource allocation unit and the number of resource elements included in the resource block. By selecting a number of resource elements that is equivalent to a greatest common multiple of the number of resource elements included in the resource allocation unit and a resource allocation block, a base station may ensure that a resource allocation fills an integer number of resource blocks. In some cases, the number of resource blocks included in a resource allocation may be selected from a sequence of numbers derived from calculating $2^i 3^j 5^k$, where i,j,k are integers that are greater than or equal to zero. By selecting a number of resource blocks in accordance with this sequence, a low complexity DFT may be utilized.

In some examples—e.g., if M equals 1, first cyclic prefix 450 equals 72 k, and second cyclic prefix 460 equals 144 k—a simplified ratio between a number of samples used for a cyclic prefix and a number of samples for first symbol period_0 420 equals 9:256, and a simplified between a number of samples used for a cyclic prefix and a number of samples for symbol period_M+1 430 equals 9:128. Thus, with an oversampling rate of 2, 128 samples may be taken for the symbol periods in slot period 405 and a resource allocation unit may include 128 resource elements. In some cases, a base station may allocate communication resources in accordance with the resource allocation unit. In some cases, a base station may allocate communication resources in an integer multiple (which may be represented as X) of resource allocation units, where X is derived from calculating $2^i 3^j 5^k$, where i,j,k are integers that are greater than or equal to zero. In other cases, a base station may allocate communication resources by selecting a number of resource blocks that include an integer number of the resource allocation unit—e.g., by computing the greatest common multiple of the number of resource elements in the resource block and the number of resource elements in the resource allocation unit divided by the number of resource elements in the resource block. For example, the base station may allocate communication resources in an integer multiple (which may be represented as Y) of 32

$$\left(\text{i.e.,}\ \frac{LCM(12, 128)}{12}\right)$$

resource blocks, where Y is derived from calculating $2^i 3^j 5^k$, where i,j,k are integers that are greater than or equal to zero.

In some examples—e.g., if M equals 2, first cyclic prefix 450 equals 96 k, and second cyclic prefix 460 equals 144 k—a simplified ratio between a number of samples used for a cyclic prefix and a number of samples for first symbol period_0 420 equals 3:64, and a simplified between a number of samples used for a cyclic prefix and a number of samples for symbol period_M+1 430 equals 9:128. Thus, with an oversampling rate of 2, 64 samples may be taken for the symbol periods in slot period 405 and a resource allocation unit may include 64 resource elements. In some cases, a base station may allocate communication resources in X resource allocation units. In other cases, a base station may allocate communication resources in Y of 16

$$\left(\text{i.e., } \frac{LCM(12,64)}{12}\right)$$

resource blocks.

In some examples—e.g., if M equals 5, first cyclic prefix 450 equals 120 k, and second cyclic prefix 460 equals 144 k—a simplified ratio between a number of samples used for a cyclic prefix and a number of samples for first symbol period_0 420 equals 15:256, and a simplified between a number of samples used for a cyclic prefix and a number of samples for symbol period_M+1 430 equals 9:128. Thus, with an oversampling rate of 2, 128 samples may be taken for the symbol periods in slot period 405 and a resource allocation unit may include 128 resource elements. In some cases, a base station may allocate communication resources in X resource allocation units. In other cases, a base station may allocate communication resources in Y of 32

$$\left(\text{i.e., } \frac{LCM(12,128)}{12}\right)$$

resource blocks.

In some examples—e.g., if M equals 8, first cyclic prefix 450 equals 128 k, and second cyclic prefix 460 equals 144 k—a simplified ratio between a number of samples used for a cyclic prefix and a number of samples for first symbol period_0 420 equals 1:16, and a simplified between a number of samples used for a cyclic prefix and a number of samples for symbol period_M+1 430 equals 9:128. Thus, with an oversampling rate of 2, 64 samples may be taken for the symbol periods in slot period 405 and a resource allocation unit may include 64 resource elements. In some cases, a base station may allocate communication resources in X resource allocation units. In other cases, a base station may allocate communication resources in Y of 16

$$\left(\text{i.e., } \frac{LCM(12,64)}{12}\right)$$

resource blocks.

Table 4 shows example resource allocations if M=1 or 5, where 70% of a bandwidth (e.g., 540 MHz, 1,080 MHz, or 2,160 MHz) may be occupied. As shown in Table 4, if a base station allocates resources to fill an integer number of resource blocks, the available resource allocations may be limited to the instances where Y is equal to 1 or 2.

TABLE 4

| X | Y | Number of RBs | Bandwidth (MHz) |
|---|---|---|---|
| 1 | N/A | 10⅔ | 245.8 |
| 2 | N/A | 21⅓ | 491.5 |
| 3 | 1 | 32 | 737.3 |
| 4 | N/A | 42⅔ | 983.04 |
| 5 | N/A | 53⅓ | 1228.8 |
| 6 | 2 | 64 | 1474.6 |

Table 5 shows examples resource allocations if M=2 or 8, where 70% of a bandwidth (e.g., 540 MHz, 1,080 MHz, or 2,160 MHz) may be occupied. As shown in Table 2, if a base station allocates resources to fill an integer number of resource blocks, the available resource allocations may be limited to the instances where Y is equal to 1.

TABLE 5

| X | Y | Number of RBs | Bandwidth (MHz) |
|---|---|---|---|
| 1 | N/A | 5⅓ | 122.9 |
| 2 | N/A | 10⅔ | 245.8 |
| 3 | 1 | 16 | 368.6 |
| 4 | N/A | 21⅓ | 491.5 |
| 5 | N/A | 26⅔ | 614.4 |
| 6 | 2 | 32 | 737.3 |
| 8 | N/A | 42⅔ | 983 |
| 9 | 3 | 48 | 1105.9 |
| 10 | N/A | 53⅓ | 1228.8 |
| 12 | 4 | 64 | 1474.6 |

In some cases, the base station may multiplex SS blocks with symbols within slot period 405 that are prepended with a cyclic prefix having a length of 144 k. Although the above discussion of FIG. 4 discusses the addition of a symbol period at an end of slot period 405, the above discussion and calculations may also apply if a symbol period is added at a beginning of slot period 405.

Figure 5:
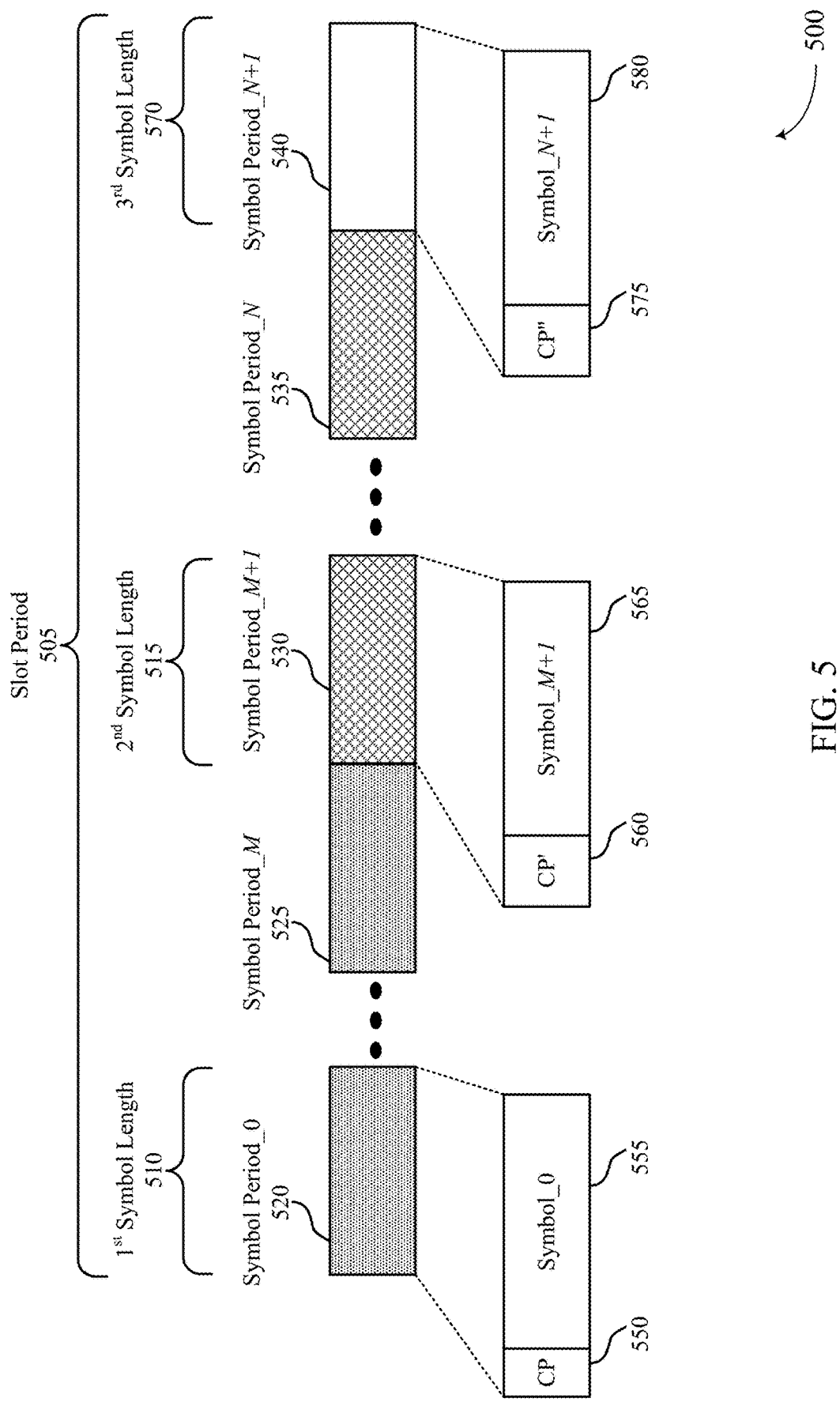

FIG. 5 illustrates aspects of a resource configuration that supports cyclic prefix distribution in accordance with one or more aspects of the present disclosure.

Resource configuration 500 may indicate (e.g., to a base station and/or UE) how to map a data transmission (or how a data transmission is mapped) to communication resources for a subcarrier spacing (e.g., 960 KHz). In some cases, resource configuration 500 may indicate how many symbols are included in the data transmission (e.g., 15 symbols), a length of particular cyclic prefixes, a length of symbols (e.g., 2,048 k), a length of a slot (e.g., 30,720 k), and the like. It is to be understood that references to specific values, parameters, or formulae described herein are provided for illustrative purposes, and different values, parameters, or formulae not specifically referred to herein may be used. Resource configuration 500 may include slot period 505, first symbol length 510, and second symbol length 515. Slot period 505 may indicate a duration of a slot for a particular subcarrier spacing. For example, for a subcarrier spacing of 960 KHz, a duration of slot period 505 may be equivalent to $$30,720\,k \Rightarrow 30,720 * \frac{1}{2,048 * 960,000} \approx 15.62 \text{ microseconds.}$$

When a subcarrier spacing of 960 KHz is used, 32 slots may be included in a designated interval (e.g., a 0.5 millisecond interval).

Resource configuration 500 may include slot period 505, first symbol length 510, second symbol length 515, symbol period_0 520, symbol period_M 525, symbol period_M+1 530, symbol period_N 535, first cyclic prefix 550, first symbol 555, second cyclic prefix 560, and second symbol 565, which may be examples of slot period 405, first symbol length 410, second symbol length 415, symbol period_0 420, symbol period_M 425, symbol period_M+1 430, symbol period_N 435, first cyclic prefix 450, first symbol 455, second cyclic prefix 460, and second symbol 465, as described with reference to FIG. 4.

Resource configuration 500 may also include third symbol length 570, third cyclic prefix 575, and third symbol 580. Third symbol length 570 may indicate a duration for transmitting a symbol and corresponding cyclic prefix for the configured subcarrier spacing. In some cases, third symbol length 570 is different than the duration indicated by the first symbol length 510 and the second symbol length 515. In some cases, a length of third cyclic prefix 575 may be different than a length of first cyclic prefix 550 and second cyclic prefix 560. In some cases, a length of third symbol 580 may be equivalent to first symbol 555 and second symbol 565.

In some examples—e.g., if a subcarrier spacing of 960 KHz is used—a length for first cyclic prefix 550 may be calculated as being equivalent to 1,168 k, which may be further broken into a length of 144 k and an additional length 1,024 k. Also, a length for symbol period_N+1 540 may be equivalent to 2,128 k, where a length of a third cyclic prefix 575 may be equivalent to 80 k and a length of a respective symbol may be equivalent to 2,048 k.

In some cases, the additional length of first cyclic prefix 550 may be redistributed to symbol period_N+1 540—i.e., the calculated length for first cyclic prefix 550 may be reduced to fit the additional symbol period within slot period 505. After redistributing the additional length of first cyclic prefix 550, symbol period_0 520 through symbol period_N+1 545 may not fit within slot period 505—e.g., the symbol periods may have a length that exceeds the length of slot period by 1104 k=2,128 k−1,024 k. Thus, an additional length of first cyclic prefix 550 and a length of at least one subsequent cyclic prefix (e.g., symbol period_M 525) may be reduced by a combined length of 1104 k to fit the additional symbol period within slot period 505.

In some cases, the length of the remaining cyclic prefix for symbol period_0 520 and the cyclic prefixes calculated for the subsequent symbol periods up through and including symbol period_M 525 may each be reduced by a first amount. In some cases, the length of cyclic prefixes calculated for symbol period_M+1 530 through symbol period_N 535 (including second cyclic prefix 560) may also be reduced by a second amount to fit the additional symbol period within slot period 505. In some cases, the length of the cyclic prefixes used for symbol period_0 520 to symbol period_N 535 may be reduced until a combined length of the cyclic prefixes equals 912 k, and a total length of the cyclic prefixes used for symbol period_0 520 to symbol period_N+1 540 may be reduced until a combined length of the cyclic prefixes equals 992 k. In some examples, where M equals 3, a length of the cyclic prefixes used for symbol period_0 520 through symbol period_M may be equivalent to 48 k, the length of the cyclic prefixes used for symbol period_M+1 530 through symbol period_N may be equivalent to 72 k, and the length of the cyclic prefixes used for symbol period_N+1 540 may be equivalent to 80 k.

In another example, a length for symbol period_N+1 540 may be equivalent to 2,192 k, where a length of a third cyclic prefix 575 may be equivalent to 144 k and a length of a respective symbol may be equivalent to 2,048 k. In some examples, to support an additional symbol, where M equals 11, a length of the cyclic prefixes used for symbol period_0 520 through symbol period_M may be equivalent to 52 k, the length of the cyclic prefixes used for symbol period_M+1 530 through symbol period_N−1 may be equivalent to 80 k, and the length of the cyclic prefixes used for symbol period_N 535 and symbol period_N+1 540 may be equivalent to 144 k. By using a length of 144 k for third cyclic prefix 575, a base station may multiplex SS blocks with symbol period_N+1 540.

As suggested above, the lengths of the cyclic prefixes may be reduced to form any combination that results in the total length of the cyclic prefixes adding up to 992 k to support the addition of a symbol. In some cases, more than three different lengths may be used for the cyclic prefixes in slot period 505. For example, where M equals 9, a first cyclic prefix length of 48 k may be used for symbol period_0 520 through symbol period_M 525; a second cyclic prefix length of 72 k may be used for symbol period_M+1 530 and symbol period_M+2; a third cyclic prefix length of 80 k may be used for symbol period_M+3; and a fourth cyclic prefix length of 144 k may be used for symbol period_N 535 and symbol period_N+1 540. In another example, where M equals 9, a first cyclic prefix length of 48 k may be used for symbol period_0 520 through symbol period_M 525; a second cyclic prefix length of 96 k may be used for symbol period_M+1 530 and symbol period_M+3; a third cyclic prefix length of 80 k may be used for symbol period_N 535; and a fourth cyclic prefix length of 144 k may be used for symbol period_N+1 540.

In another example, where M equals 7, a first cyclic prefix length of 48 k may be used for symbol period_0 520 through symbol period_M 525; a second cyclic prefix length of 72 k may be used for symbol period_M+1 530 and symbol period_M+4; a third cyclic prefix length of 80 k may be used for symbol period_N−1; a fourth cyclic prefix length of 96 k may be used for symbol period_N 535; and a fifth cyclic prefix length of 144 k may be used for symbol period_N+1 540. In another example, where M equals 8, a first cyclic prefix length of 48 k may be used for symbol period_0 520 through symbol period_M 525; a second cyclic prefix length of 72 k may be used for symbol period_M+1 530 and symbol period_M+2; a third cyclic prefix length of 80 k may be used for symbol period_M+3; a fourth cyclic prefix length of 96 k may be used for symbol period_N−1 and symbol period_N 535; and a fifth cyclic prefix length of 144 k may be used for symbol period_N+1 540. In some cases, the lengths of the cyclic prefixes in the symbol periods within slot period 505 may be selected to be divisible by four.

In some cases, a base station may allocate resources based on the cyclic prefix lengths used for slot period 505 using the techniques discussed herein. Additionally, or alternatively, the base station may multiplex SS blocks with symbols within slot period 505 that are prepended with a cyclic prefix having a length of 144 k. Although the above discussion of FIG. 5 discusses the addition of a symbol period at an end of slot period 505, the above discussion and calculations may also apply if a symbol period is added at a beginning of slot period 505.

Figure 6:
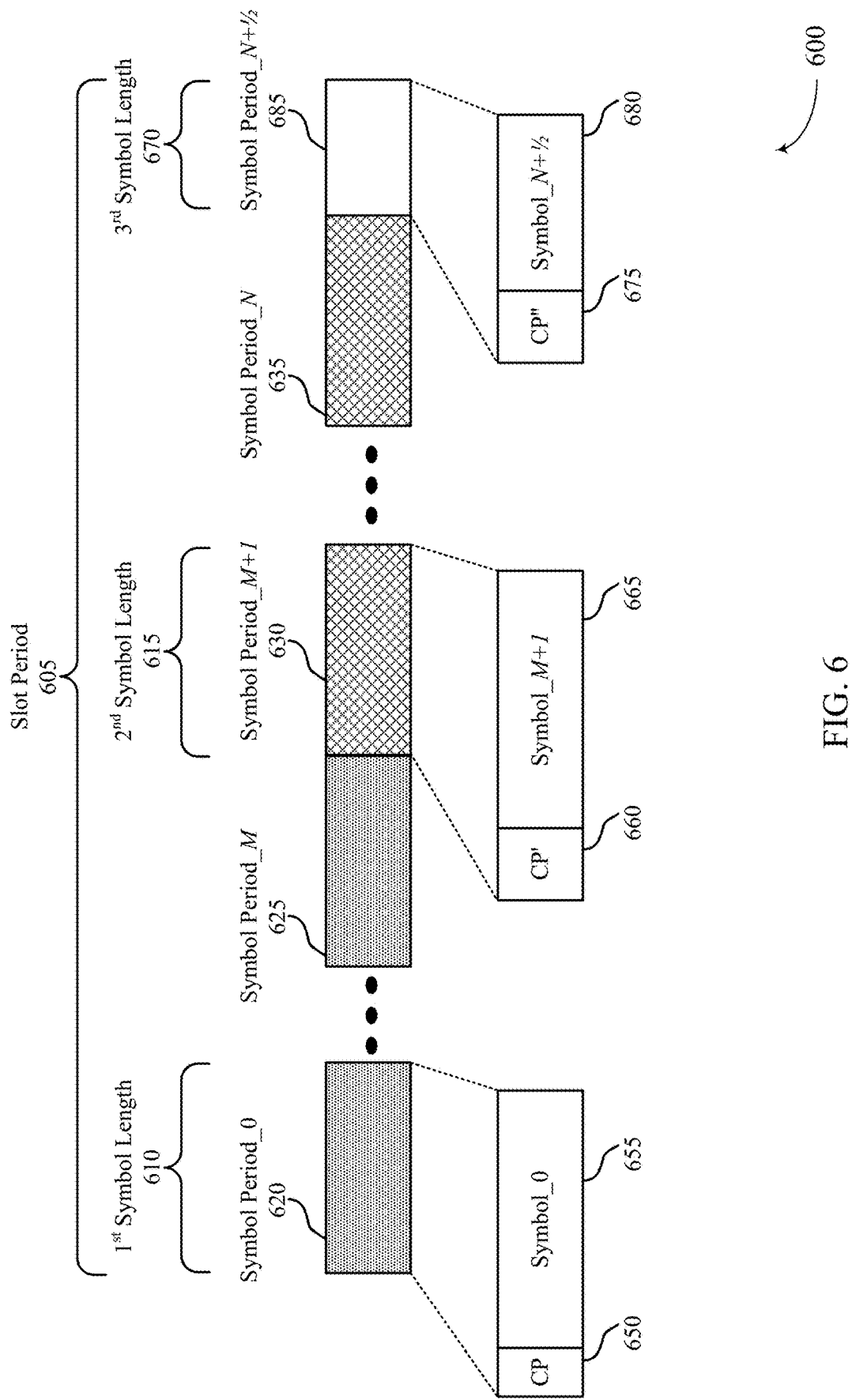

FIG. 6 illustrates aspects of a resource configuration that supports cyclic prefix distribution in accordance with one or more aspects of the present disclosure.

Resource configuration 600 may indicate (e.g., to a base station and/or UE) how to map a data transmission (or how a data transmission is mapped) to communication resources for a subcarrier spacing (e.g., 960 KHz). In some cases, resource configuration 600 may indicate how many symbols are included in the data transmission (e.g., 15 symbols), a length of particular cyclic prefixes, a length of symbols (e.g., 2,048 k), a length of a slot (e.g., 30,720 k), and the like. It is to be understood that references to specific values, parameters, or formulae described herein are provided for illustrative purposes, and different values, parameters, or formulae not specifically referred to herein may be used. Resource configuration 600 may include slot period 605, first symbol length 610, and second symbol length 615. Slot period 605 may indicate a duration of a slot for a particular subcarrier spacing. For example, for a subcarrier spacing of 960 KHz, a duration of slot period 605 may be equivalent to $$30{,}720\,k \Rightarrow 30{,}720 * \frac{1}{2{,}048 * 960{,}000} \approx 15.62 \text{ microseconds}.$$

When a subcarrier spacing of 960 KHz is used, 32 slots may be included in a designated interval.

Resource configuration may include slot period 605, first symbol length 610, second symbol length 615, symbol period_0 620, symbol period_M 625, symbol period_M+1 630, symbol period_N 635, first cyclic prefix 650, first symbol 655, second cyclic prefix 660, and second symbol 665, which may be examples of slot period 505, first symbol length 510, second symbol length 515, symbol period_0 520, symbol period_M 525, symbol period_M+1 530, symbol period_N 535, first cyclic prefix 550, first symbol 555, second cyclic prefix 560, and second symbol 565, as described with reference to FIG. 5.

Resource configuration may also include third symbol length 670, third cyclic prefix 675, and third symbol 680. Third symbol length 670 may indicate a duration for transmitting a symbol and corresponding cyclic prefix for the configured subcarrier spacing that is different than the duration indicated by the first symbol length 610 and the second symbol length 615. In some cases, a length of third cyclic prefix 675 may be equivalent to a length of first cyclic prefix 650 and second cyclic prefix 660. In some cases, a length of third symbol 680 may be equivalent to a half of first symbol 655 or second symbol 665. In some cases, third symbol 680 may be configured to convey information and/or a reference signal.

In some examples—e.g., if a subcarrier spacing of 960 KHz is used—a length for first cyclic prefix 650 may be calculated as being equivalent to 1,168 k, which may be further broken into a length of 144 k and an additional length 1,024 k. Also, a length for symbol period_N+½ 685 may be equivalent to 1,168 k, where a length of a third cyclic prefix 675 may be equivalent to 144 k and a length of a respective symbol may be equivalent to 1,024 k.

In some cases, the additional length of first cyclic prefix 650 may be redistributed to symbol period_N+½ 685—i.e., the calculated length for first cyclic prefix 650 may be reduced to fit the additional half symbol period within slot period 605. After redistributing the additional length of first cyclic prefix 650, symbol period_0 620 through symbol period_N+½ 685 may not fit within slot period 605—e.g., the symbol periods may have a length that exceeds the length of slot period by 144 k=1,168 k−1,024 k. Thus, an additional length of first cyclic prefix 650 and a length of at least one subsequent cyclic prefix (e.g., symbol period_M 625) may be reduced by a combined length of 144 k to fit the additional symbol period within slot period 605. In some cases, the length of the remaining cyclic prefix for symbol period_0 620 and the cyclic prefixes calculated for the subsequent symbol periods up through and including symbol period_M 625 may be reduced by a same amount. For example, if M=1, the length of first cyclic prefix 650 and the cyclic prefix used for symbol period_M 625 may be reduced by $$72\ k\left(\text{i.e.,}\ \frac{144\ k}{2}\right),$$

such that the length of first cyclic prefix 650 up through and including the Mth cyclic prefix may be equivalent to 72 k.

More generally, the remaining length of the first cyclic prefix 650 used for symbol period_0 620 and the cyclic prefixes for the subsequent cyclic prefixes up through and including symbol period_M 625 may be reduced by $$\frac{144\ k}{M+1}.$$

In an example where M=2, the length of first cyclic prefix 650 up through and including the Mth cyclic prefix may be equivalent to 96 k. In an example where M=5, the length of first cyclic prefix 650 up through and including the Mth cyclic prefix may be equivalent to 120 k. In an example where M=8, the length of first cyclic prefix 650 up through and including the Mth cyclic prefix may be equivalent to 128 k.

In some cases, a length of cyclic prefixes used for symbol period_M+1 630 to symbol period_N+½ 685 is equivalent to 144 k. By using cyclic prefixes having a length of 144 k, a symbol period may support control signaling such as SS block or reference signals. In some cases, the length of the cyclic prefixes included in symbol period_0 620 up through and including symbol period_M 625 may be equivalent to values that are multiples of four. By using cyclic prefixes having lengths that are multiples of four, a received signal may be scaled down to support a 512 k FFT.

In some cases, a base station may allocate resources based on an arrangement of resource configuration 600 for a subcarrier spacing of 960 KHz. In some cases, the base station may allocate resources as described with reference to FIG. 4. Additionally, or alternatively, the base station may multiplex SS blocks with symbols within slot period 605 that are prepended with a cyclic prefix having a length of 144 k. Although the above discussion of FIG. 6 discusses the addition of a symbol period at an end of slot period 605, the above discussion and calculations may also apply if a symbol period is added at a beginning of slot period 605.

Figure 7:
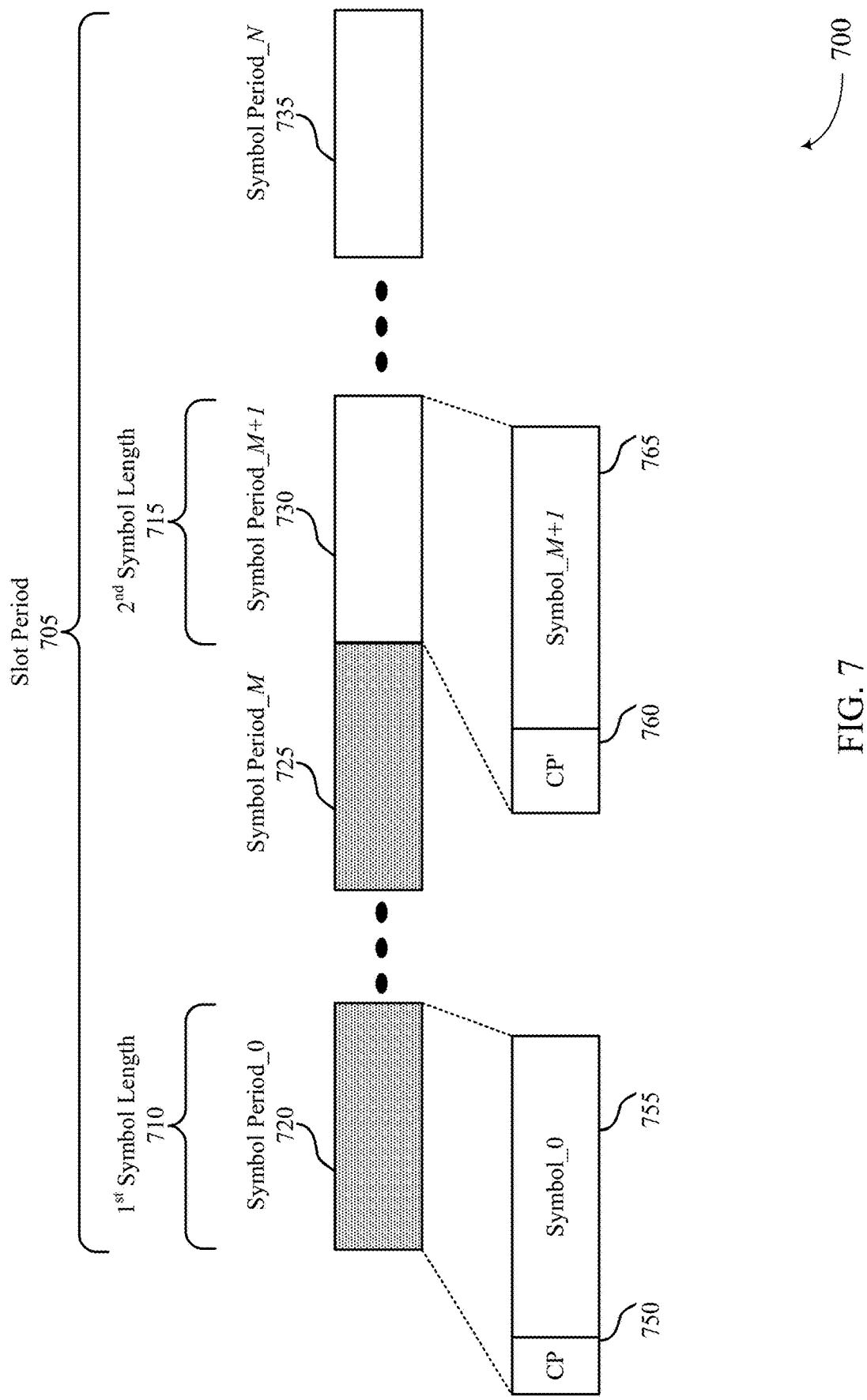

FIG. 7 illustrates aspects of a resource configuration that supports cyclic prefix distribution in accordance with one or more aspects of the present disclosure.

Resource configuration 700 may indicate (e.g., to a base station and/or UE) how to map a data transmission (or how a data transmission is mapped) to communication resources for a subcarrier spacing (e.g., 960 KHz). In some cases, resource configuration 700 may indicate how many symbols are included in the data transmission (e.g., 15 symbols), a length of particular cyclic prefixes, a length of symbols (e.g., 2,048 k), a length of a slot (e.g., 30,720 k), and the like. It is to be understood that references to specific values, parameters, or formulae described herein are provided for illustrative purposes, and different values, parameters, or formulae not specifically referred to herein may be used. Resource configuration 700 may include slot period 705, first symbol length 710, and second symbol length 715. Slot period 705 may indicate a duration of a slot for a particular subcarrier spacing. For example, for a subcarrier spacing of 960 KHz, a duration of slot period 705 may be equivalent to $$30{,}720\,k \Rightarrow 30{,}720 * \frac{1}{2{,}048 * 960{,}000} \approx 15.62 \text{ microseconds.}$$

When a subcarrier spacing of 960 KHz is used, 32 slots may be included in a designated interval (e.g., a 0.5 millisecond interval).

Resource configuration 700 may include slot period 705, first symbol length 710, second symbol length 715, symbol period_0 720, symbol period_M 725, symbol period_M+1 730, symbol period_N 735, first cyclic prefix 750, first symbol 755, second cyclic prefix 760, and second symbol 765, which may be examples of slot period 605, first symbol length 610, second symbol length 615, symbol period_0 620, symbol period_M 625, symbol period_M+1 630, symbol period_N 635, first cyclic prefix 650, first symbol 655, second cyclic prefix 660, and second symbol 665, as described with reference to FIG. 6.

In some cases, unlike FIGS. 3 through 6, no additional half or full symbols may be added to slot period 705 relative to other slots periods within a designated interval. In some examples—e.g., if a subcarrier spacing of 960 KHz is used—a length for first cyclic prefix 750 may be calculated as being equivalent to 1,168 k, which may be further broken into a length of 144 k and an additional length 1,024 k. In some cases, the additional length of first cyclic prefix 750 may be redistributed among first cyclic prefix 750 through the cyclic prefix used for symbol period_M 625. For example, if M equals 3, the additional length may be distributed among the four cyclic prefixes such that the lengths of the subsequent symbol periods (including symbol period_M 625) may be increased by $$256\ k \left( \text{i.e., } \frac{1{,}024\ k}{4} \right)$$

and the length of first cyclic prefix may be decreased by $$768\ k \left( \text{i.e., } 3 * \frac{1{,}024\ k}{4} \right).$$

Thus, first cyclic prefix 750 and the subsequent cyclic prefixes may each have a length of 400 k.

More generally, the length of the first cyclic prefix 750 used for symbol period_0 720 may be reduced by $$M\left(\frac{1{,}024\ k}{M+1}\right)$$

and the length of the subsequent symbol periods may be increased by $$\frac{1{,}024\ k}{M+1}.$$

In an example where M=7, the length of first cyclic prefix 650 up through and including the Mth cyclic prefix used for symbol period_M 625 may be equivalent to 272 k. In some cases, a length of cyclic prefixes used for symbol period_M+1 730 to symbol period_N 735 is equivalent to 144 k. By using cyclic prefixes having a length of 144 k, a symbol period may support control signaling such as SS block or reference signals. In some cases, the length of the cyclic prefixes included in symbol period_0 720 up through and including symbol period_M 725 may be equivalent to values that are multiples of four. By using cyclic prefixes having lengths that are multiples of four, a received signal may be scaled down to support a 512 k FFT.

Figure 8:
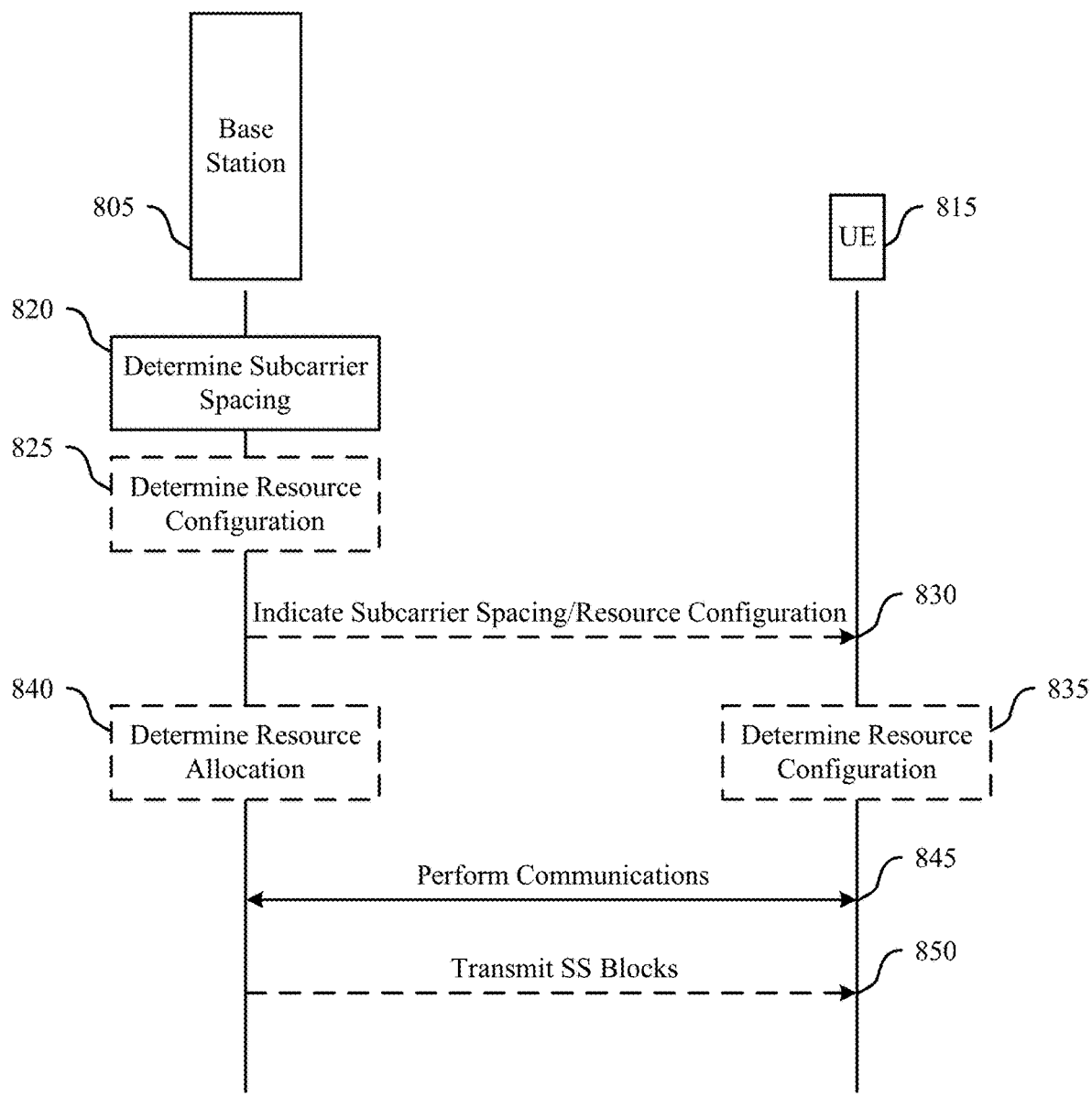
FIG. 8 illustrates an example of a process for cyclic prefix distribution in accordance with one or more aspects of the present disclosure.

FIG. 8 illustrates aspects of a process for cyclic prefix distribution in accordance with one or more aspects of the present disclosure.

Process flow 800 may be performed by base station 805 and UE 815, which may be examples of a base station or UE described above with reference to FIGS. 1 and 2. In some examples, process flow 800 illustrates operations for indicating a resource configuration used for communications between base station 805 based on a configured subcarrier spacing.

At 820, base station 805 may configure, or be configured for, a subcarrier spacing (e.g., a subcarrier spacing of 960 KHz, 1,920 KHz, or 3,840 KHz). In some cases, base station 805 selects a subcarrier spacing—e.g., based on measured or predicted channel conditions. In some cases, base station 805 is programmed by an operator to use a particular subcarrier spacing.

At 825, base station 805 may determine a resource configuration based on a configured subcarrier spacing. In some cases, base station 805 may determine a first set of resource configurations is available for a first subcarrier spacing, a second set of resource configurations is available for a second subcarrier spacing, a third set of resource configurations is available for a third subcarrier spacing, and so on. In some cases, the resource configurations indicate a length of cyclic prefixes included in a slot. In some examples, the resource configuration indicates a first set of cyclic prefix lengths for a first slot in a designated interval (which may be referred to as a "special slot") and a second set of cyclic prefix lengths for the remaining slots in the designated interval. In some cases, the resource configuration also indicates a number of symbols included in a slot. In some examples, the resource configuration indicates that a special slot includes a first number of symbols and that the remaining slots in a designated interval include a second number of symbols. In some cases, the first number of symbols is greater than the second number of symbols. For example, the first number of symbols may include two additional symbols, one additional symbol, or a half of an additional symbol. In some cases, base station 805 may select a predetermined resource configuration that reflects a redistribution of a portion of a length of a special cyclic prefix to additional half or full symbol(s). For example, base station 805 may select a resource configuration for a subcarrier spacing based on the available resource configurations discussed with reference to FIGS. 3 through 7.

At 830, base station 805 may indicate a configured subcarrier spacing to UE 815. In some cases, UE 815 may determine a resource configuration used by base station 805 based on the received subcarrier spacing. For example, UE 815 may determine that a particular resource configuration is being used by base station 805 based on determining that base station 805 is using a 960 KHz subcarrier spacing. In some cases, base station 805 may also indicate a selected resource configuration to UE 815. In some examples, the indicated resource configuration may indicate a length of cyclic prefixes used for a special slot and a length of cyclic prefixes used for the remaining slots in a designated interval as well as a number of symbols included in a special slot and the remaining slots. In some cases, indicating the resource configuration includes explicitly indicating a length of a first set of cyclic prefixes and a second set of cyclic prefixes for a special slot and explicitly indicating a number of symbols included in a special slot.

In other cases, indicating the resource configuration includes indicating a subcarrier spacing and a value that corresponds to a particular resource configuration. For example, to indicate that a predetermined resource configuration that includes a special slot with an additional symbol, two cyclic prefixes having a length of 72 k, and the remaining cyclic prefixes having a length of 144 k, base station 805 may indicate that a subcarrier spacing of 960 KHz is being used and may transmit a binary value of "00." For example, to indicate that a predetermined resource configuration that includes a special slot with an additional symbol, three cyclic prefixes having a length of 96 k, and the remaining cyclic prefixes having a length of 144 k, base station 805 may indicate that a subcarrier spacing of 960 KHz is being used and may transmit a binary value of "01." After receiving the indication of the subcarrier spacing and resource configuration, UE 815 may identify a predetermined resource configuration for the subcarrier spacing that corresponds to the received value (e.g., using a lookup table). If only one predetermined resource configuration is configured for a subcarrier spacing, UE 815 may identify a resource configuration based solely on receiving a configured subcarrier spacing.

At 835, UE 815 may similarly determine the resource configuration based on the subcarrier spacing and/or indicated resource configuration. Determining the resource configuration may include determining a length of symbols and cyclic prefixes and a number of symbols included in one or more slots. In some cases, determining the resource configuration may include determining a first number of symbols are included in a special slot and a second number of symbols are included in other slots. In some cases, determining the resource configuration may also include determining a length of cyclic prefixes in a special slot is different than a length of cyclic prefixes included in other slots. In some cases, determining the resource configuration may include determining a number of slots that are included in a designated interval (e.g., a 0.5 ms interval). In some cases, determining the resource configuration may include identifying a predetermined resource configuration based on the indicated subcarrier spacing and/or resource configuration.

At 840, base station 805 may determine a resource allocation for UE 815, as discussed herein and with reference to FIGS. 3 through 7. In some cases, a resource allocation is based on a length of the cyclic prefixes used for symbols in a special slot and ordinary slots. In some cases, the resource allocation is further based on a size of a resource block. The resource allocation may also be based on selecting a resource allocation unit that includes a number of resource elements and/or resource blocks that is selected from a sequence of numbers derived from calculating $2^i 3^j 5^k$, where i,j,k are integers that are greater than or equal to zero.

At 845, base station 805 and UE 815 may perform communications to exchange data. In some cases, performing communications includes indicating, by the base station 805, a resource allocation for UE 815. In some cases, indicating the resource allocation includes indicating a downlink assignment of communication resources or an uplink grant of communication resources. After or concurrently with indicating the resource allocation, base station 805 and UE 815 may communicate over the allocated communication resources.

At 850, base station 805 may transmit one or more SS blocks to UE 815. In some cases, base station 805 multiplexes the SS blocks with symbols that are prepended with a cyclic prefix having a length of 144 k. In some cases, all of the symbols in an ordinary slot are prepended with a cyclic prefix having a length of 144 k. Thus, base station 805 may multiplex an SS block with any of the symbols in an ordinary slot. In some cases, a portion of the symbols in a special slot are prepended with a cyclic prefix having a length of 144 k. Thus, base station 805 may multiplex an SS block with a portion the symbols in a special slot. In some cases, none of the symbols in a special slot are prepended with a cyclic prefix having a length of 144 k. Thus, base station 805 may refrain from multiplexing an SS block with any of the symbols in a special slot.

In some cases, certain operations discussed above may be omitted or performed in a different order than shown in FIG. 8. For example, in some cases, base station 805 may indicate the subcarrier spacing before determining a resource configuration, and UE 815 may determine a resource configuration before or concurrently with base station 805 determining the resource configuration.

Figure 9:
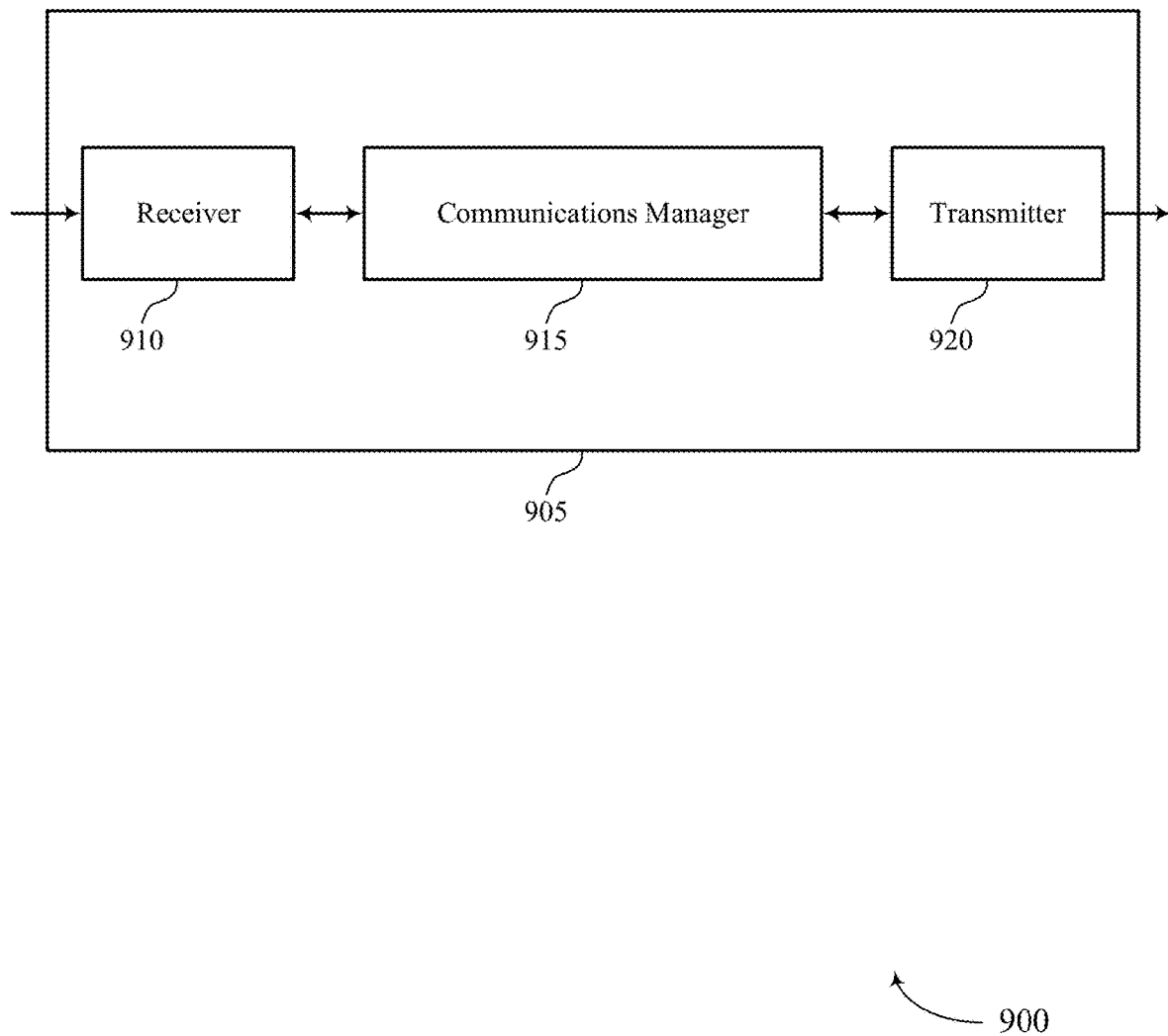
FIG. 9 shows a block diagram of a device that supports cyclic prefix distribution in accordance with one or more aspects of the present disclosure.

FIG. 9 shows a block diagram 900 of a device 905 that supports cyclic prefix distribution in accordance with one or more aspects of the present disclosure. The device 905 may be an example of aspects of a UE 115 or base station 105 as described herein. The device 905 may include a receiver 910, a communications manager 915, and a transmitter 920. The device 905 may also include a processor. Each of these components may be in communication with one another (e.g., via one or more buses).

Receiver 910 may receive information such as packets, user data, or control information associated with various information channels (e.g., control channels, data channels, and information related to cyclic prefix distribution, etc.). Information may be passed on to other components of the device 905. The receiver 910 may be an example of aspects of the transceiver 1120 or 1220 as described with reference to FIGS. 11 and 12. The receiver 910 may utilize a single antenna or a set of antennas.

The communications manager 915 may configure a subcarrier spacing for performing wireless communications. The communications manager 915 may also identify, for an initial slot of a periodic interval, a number of symbols included in the initial slot, a first length of a first set of cyclic prefixes used for a first set of symbols of the initial slot and a second length of a second set of cyclic prefixes used for a second set of symbols of the initial slot, where the first length of the first set of cyclic prefixes is based on a length of a cyclic prefix calculated for an initial symbol of the initial slot, where the calculated length of the cyclic prefix is different than the first length of the first set of cyclic prefixes and based on the subcarrier spacing. The communications manager 915 may also communicate, using the initial slot, data based on the identified first set of cyclic prefixes and the identified second set of cyclic prefixes. The communications manager 915 may be an example of aspects of the communications manager 1110 or 1210 as described herein.

The communications manager 915 may be an example of means for performing various aspects of cyclic prefix distribution as described herein. The communications manager 915, or its sub-components, may be implemented in hardware (e.g., in communications management circuitry). The circuitry may comprise a processor, digital signal processor (DSP), an application-specific integrated circuit (ASIC), a FPGA or other programmable logic device, discrete gate or transistor logic, discrete hardware components, or any combination thereof designed to perform the functions described in the present disclosure.

In another implementation, the communications manager 915, or its subcomponents, may be implemented in code (e.g., as communications management software or firmware) executed by a processor, or any combination thereof. If implemented in code executed by a processor, the functions of the communications manager 915, or its sub-components may be executed by a general-purpose processor, a DSP, an ASIC, an FPGA, or other programmable logic device.

In some examples, the communications manager 915 may be configured to perform various operations (e.g., receiving, determining, transmitting) using or otherwise in cooperation with the receiver 910, the transmitter 920, or both.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with one or more aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with one or more aspects of the present disclosure.

Transmitter 920 may transmit signals generated by other components of the device 905. In some examples, the transmitter 920 may be collocated with a receiver 910 in a transceiver module. For example, the transmitter 920 may be an example of aspects of the transceiver 1120 or 1220 as described with reference to FIGS. 11 and 12. The transmitter 920 may utilize a single antenna or a set of antennas.

Figure 10:
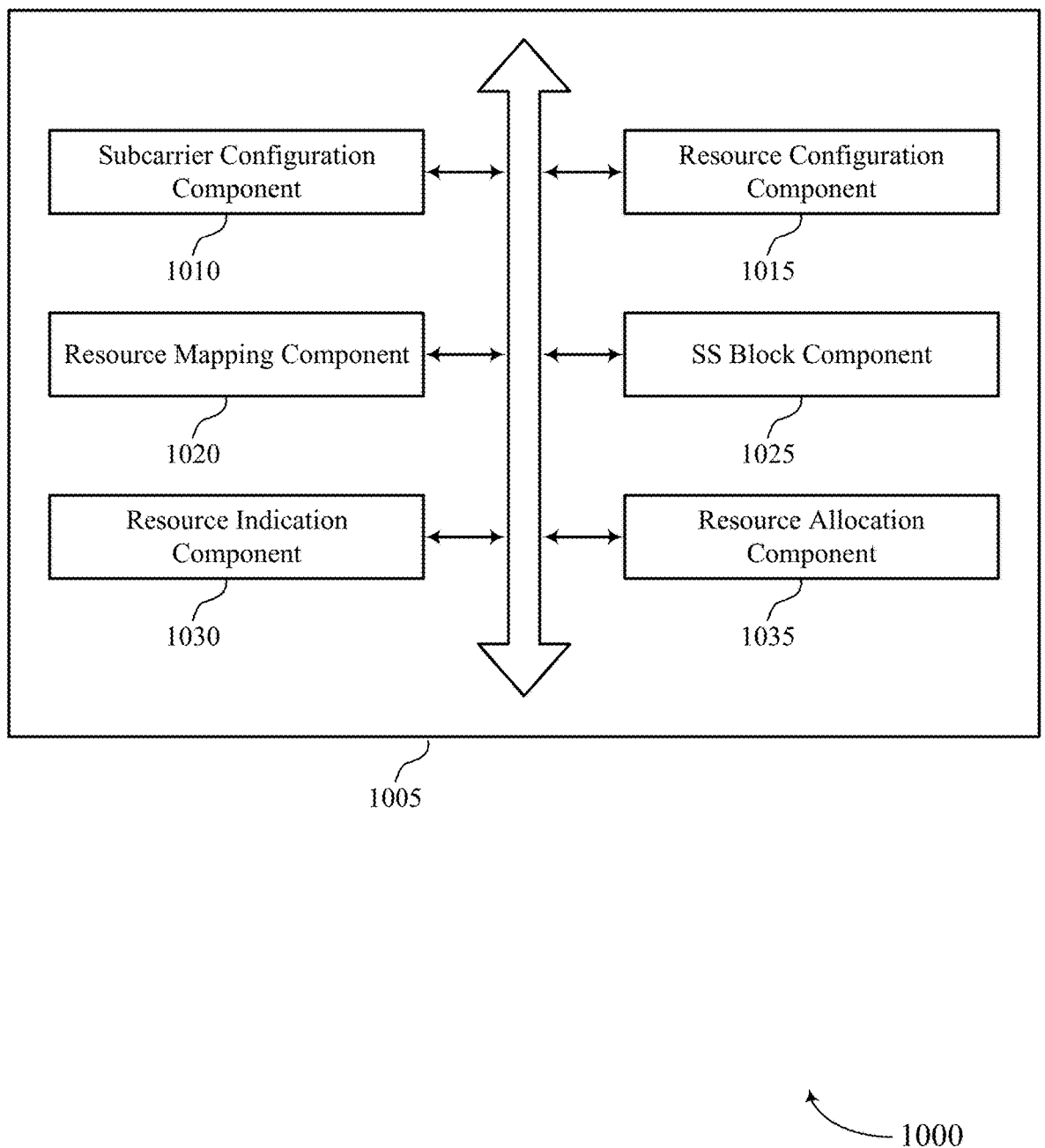
FIG. 10 shows a block diagram of a communications manager that supports cyclic prefix distribution in accordance with one or more aspects of the present disclosure.

FIG. 10 shows a block diagram 1000 of a communications manager 1005 that supports cyclic prefix distribution in accordance with one or more aspects of the present disclosure. The communications manager 1005 may be an example of aspects of a communications manager 915 or a communications manager 1110 described herein. The communications manager 1005 may include a subcarrier configuration component 1010, a resource configuration component 1015, a resource mapping component 1020, an SS block component 1025, a resource indication component 1030, and a resource allocation component 1035. Each of these modules may communicate, directly or indirectly, with one another (e.g., via one or more buses).

The subcarrier configuration component 1010 may configure a subcarrier spacing for performing wireless communications.

The resource configuration component 1015 may identify, for an initial slot of a periodic interval, a number of symbols included in the initial slot, a first length of a first set of cyclic prefixes used for a first set of symbols of the initial slot and a second length of a second set of cyclic prefixes used for a second set of symbols of the initial slot, wherein the first length of the first set of cyclic prefixes is based at least in part on a length of a cyclic prefix calculated for an initial symbol of the initial slot, wherein the calculated length of the cyclic prefix is different than the first length of the first set of cyclic prefixes and based at least in part on the subcarrier spacing. In some cases, the first length of the first set of cyclic prefixes and the second length of the second set of cyclic prefixes is based at least in part on a distribution of the calculated length of the cyclic prefix across the initial slot.

In some cases, the resource configuration component 1015 may receive an indication of a resource configuration that indicates the first length of the first set of cyclic prefixes, the second length of the second set of cyclic prefixes, and a number of symbols included in the initial slot. In some cases, the resource configuration component 1015 may select a resource configuration based at least in part on the subcarrier spacing, wherein the resource configuration indicates the first length of the first set of cyclic prefixes for the initial slot and the second length of the second set of cyclic prefixes for the initial slot. In some cases, the resource configuration indicates a third length of a third set of cyclic prefixes for a third set of symbols in a second set of slots of the periodic interval, where the second length of the second set of cyclic prefixes is equivalent to the third length of the third set of cyclic prefixes.

In some cases, the resource configuration component 1015 may identify a periodic interval comprising the initial slot and a second set of slots, a third length of a third set of cyclic prefixes used for a third set of symbols for the second set of slots, and a first symbol length of the first set of symbols, a second symbol length of the second set of symbols, and a third symbol length of the third set of symbols, wherein the first symbol length, the second symbol length, and the third symbol length are equivalent to a symbol length.

In some cases, the calculated length of the cyclic prefix includes the third length of the third set of cyclic prefixes and the symbol length based at least in part on the subcarrier spacing, and the resource configuration component 1015 may identify the initial slot comprises an additional symbol relative to the second set of slots based at least in part on the calculated length of the cyclic prefix; a fourth symbol length of the additional symbol that is equivalent to the symbol length; and a fourth length of an additional cyclic prefix used for the additional symbol. In some cases, the first length of the first set of cyclic prefixes is equivalent to a difference between the third length of the third set of cyclic prefixes and a quotient of dividing the fourth length of the additional cyclic prefix by a number of the first set of cyclic prefixes. In some cases, the first set of cyclic prefixes comprises a plurality of cyclic prefixes, the first length of the first set of cyclic prefixes may be evenly divided into four portions, and the second length of the second set of cyclic prefixes, the third length of the second set of cyclic prefixes, and the fourth length of the additional cyclic prefix are equivalent.

In some cases, the calculated length of the cyclic prefix includes the third length of the third set of cyclic prefixes and multiple of the symbol length based at least in part on the subcarrier spacing, and the resource configuration component 1015 may identify the initial slot comprises a plurality of additional symbols relative to the second set of slots based at least in part on the calculated length of the cyclic prefix; a fourth symbol length of the plurality of additional symbols that is equivalent to the symbol length; and a fourth length of a fourth set of cyclic prefixes used for the plurality of additional symbols. In some cases, the first length of the first set of cyclic prefixes is equivalent to a difference between the third length of the third set of cyclic prefixes and a quotient of dividing a combined length of the fourth set of cyclic prefixes by a number of the first set of cyclic prefixes.

In some cases, the calculated length of the cyclic prefix comprises the third length of the third set of cyclic prefixes and a half of the symbol length based at least in part on the subcarrier spacing, and the resource configuration component 1015 may identify the initial slot comprises a same number of symbols relative to the second set of slots based at least in part on the calculated length of the cyclic prefix. In some cases, the first length of the first set of cyclic prefixes is equivalent to a summation of the third length of the third set of cyclic prefixes and a quotient of dividing the half of the symbol length by the number of the first set of cyclic prefixes.

In some cases, the calculated length of the cyclic prefix comprises the third length of the third set of cyclic prefixes and a half of the symbol length based at least in part on the subcarrier spacing, and the resource configuration component 1015 may identify the initial slot comprises an additional half symbol relative to the second set of slots based at least in part on the calculated length of the cyclic prefix; a fourth symbol length of the additional half symbol that is equivalent to half of the symbol length; and a fourth length of an additional cyclic prefix used for the additional half symbol. In some cases, the first length of the first set of cyclic prefixes is equivalent to a difference between the third length of the third set of cyclic prefixes and a quotient of dividing the fourth length of the additional cyclic prefix by a number of the first set of cyclic prefixes.

In some cases, the calculated length of the cyclic prefix comprises the third length of the third set of cyclic prefixes and a half of the symbol length based at least in part on the subcarrier spacing, and the resource configuration component 1015 may identify the initial slot comprises an additional symbol relative to the second set of slots based at least in part on the calculated length of the cyclic prefix; a fourth symbol length of the additional symbol that is equivalent to the symbol length; and a fourth length of an additional cyclic prefix used for the additional symbol. In some cases, a combined length of the first set of cyclic prefixes and the second set of cyclic prefixes is equivalent to a difference between a product of multiplying the third length of the third set of cyclic prefixes by a combined number of the first set of cyclic prefixes and the second set of cyclic prefixes and a summation of the half of the symbol length and the fourth length of the additional cyclic prefix.

The resource mapping component 1020 may communicate, using the initial slot, data based at least in part on the identified first set of cyclic prefixes and the identified second set of cyclic prefixes.

The SS block component 1025 may multiplex a synchronization signal block with a symbol of the second set of symbols based at least in part on a second length of the second set of cyclic prefixes being equivalent to a third length of cyclic prefixes used for a third set of symbols of a second slot.

The resource indication component 1030 may indicate the first length of the first set of cyclic prefixes and the second length of the second set of cyclic prefixes based at least in part on the subcarrier spacing. In some cases, the resource indication component 1030 may transmit an indication of a resource configuration for the subcarrier spacing, the resource configuration indicating the first length of the first set of cyclic prefixes and the second length of the second set of cyclic prefixes.

The resource allocation component 1035 may allocate communication resources to a user equipment (UE) based at least in part on the first length of the first set of cyclic prefixes, the second length of the second set of cyclic prefixes, a first symbol length of the first set of symbols, and a second symbol length the second set of symbols. In some cases, a size of a resource allocation unit is based at least in part on a first relationship between the first length and the first symbol length and a second relationship between the second length and the second symbol length. In some cases, a size of a resource allocation unit is based at least in part on a half of a greater of a first quotient of dividing the first symbol length by a first greatest common factor of the first length and the first symbol length and a second quotient of dividing the second symbol length by a second greatest common factor of the second length and the second symbol length.

In some cases, the size of the resource allocation unit is further based at least in part on a size of a resource block. In some cases, the resource allocation unit includes a first number of resource elements, and the resource allocation component 1035 allocates a number of resource blocks that include a second number of resource elements that is an integer multiple of the first number of resource element. In some cases, the resource mapping component 1020 may communicate the data over the allocated communication resources.

Figure 11:
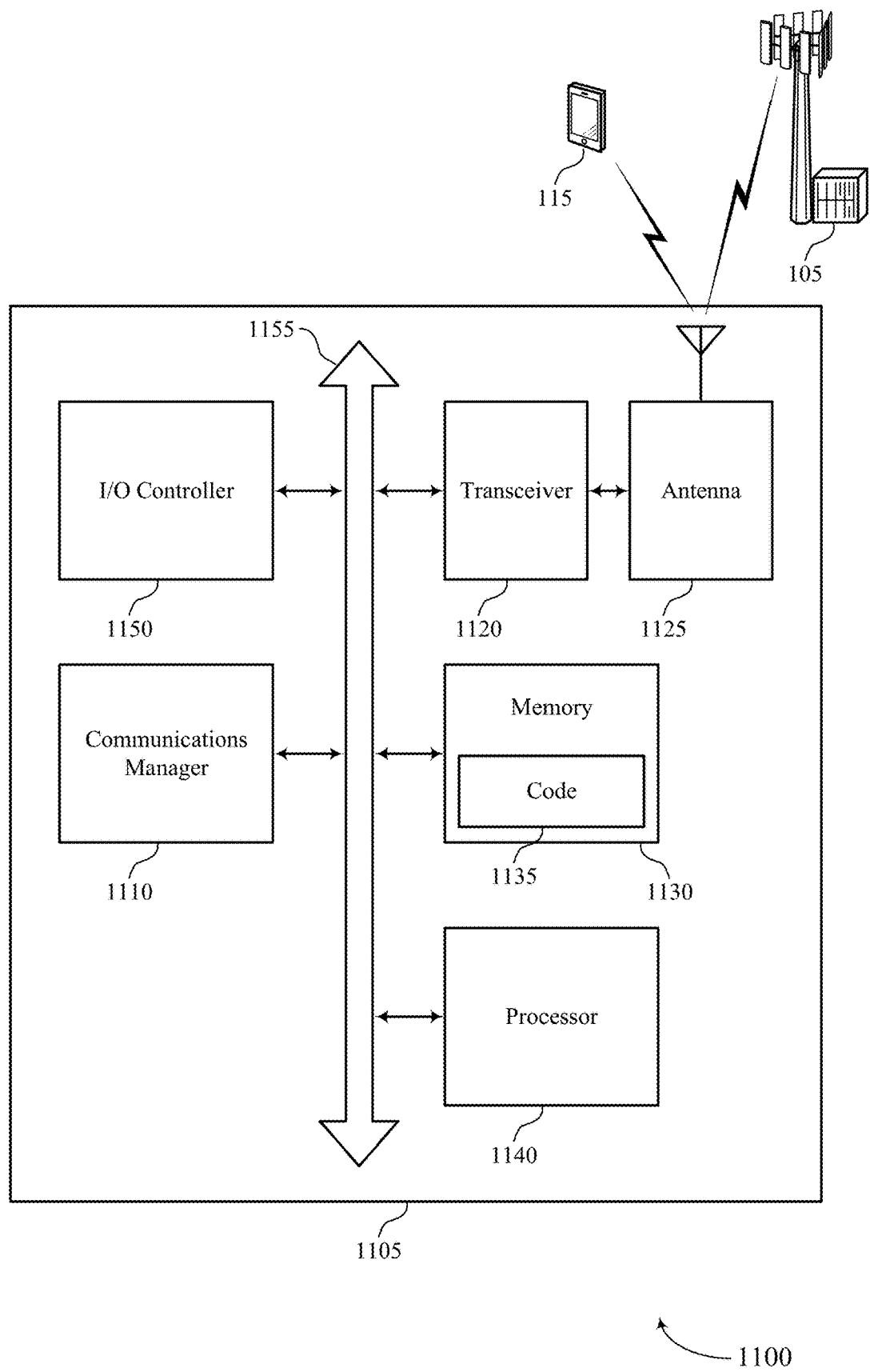
FIG. 11 shows a diagram of a system including a UE that supports cyclic prefix distribution in accordance with one or more aspects of the present disclosure.

FIG. 11 shows a diagram of a system 1100 including a device 1105 that supports cyclic prefix distribution in accordance with one or more aspects of the present disclosure. The device 1105 may be an example of or include the components of device 905 or a UE 115 as described herein. The device 1105 may include components for bi-directional voice and data communications including components for transmitting and receiving communications, including a communications manager 1110, a transceiver 1120, an antenna 1125, memory 1130, a processor 1140, and an I/O controller 1150. These components may be in electronic communication via one or more buses (e.g., bus 1155).

The communications manager 1110 may configure a subcarrier spacing for performing wireless communications, identify, for an initial slot of a periodic interval, a number of symbols included in the initial slot, a first length of a first set of cyclic prefixes used for a first set of symbols of the initial slot and a second length of a second set of cyclic prefixes used for a second set of symbols of the initial slot, where the first length of the first set of cyclic prefixes is based on a length of a cyclic prefix calculated for an initial symbol of the initial slot, where the calculated length of the cyclic prefix is different than the first length of the first set of cyclic prefixes and based on the subcarrier spacing, and communicate, using the initial slot, data based on the identified first set of cyclic prefixes and the identified second set of cyclic prefixes.

Transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM), read-only memory (ROM), or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting cyclic prefix distribution).

The I/O controller 1150 may manage input and output signals for the device 1105. The I/O controller 1150 may also manage peripherals not integrated into the device 1105. In some cases, the I/O controller 1150 may represent a physical connection or port to an external peripheral. In some cases, the I/O controller 1150 may utilize an operating system such as iOS®, ANDROID®, MS-DOS®, MS-WINDOWS®, OS/2®, UNIX®, LINUX®, or another known operating system. In other cases, the I/O controller 1150 may represent or interact with a modem, a keyboard, a mouse, a touchscreen, or a similar device. In some cases, the I/O controller 1150 may be implemented as part of a processor. In some cases, a user may interact with the device 1105 via the I/O controller 1150 or via hardware components controlled by the I/O controller 1150.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
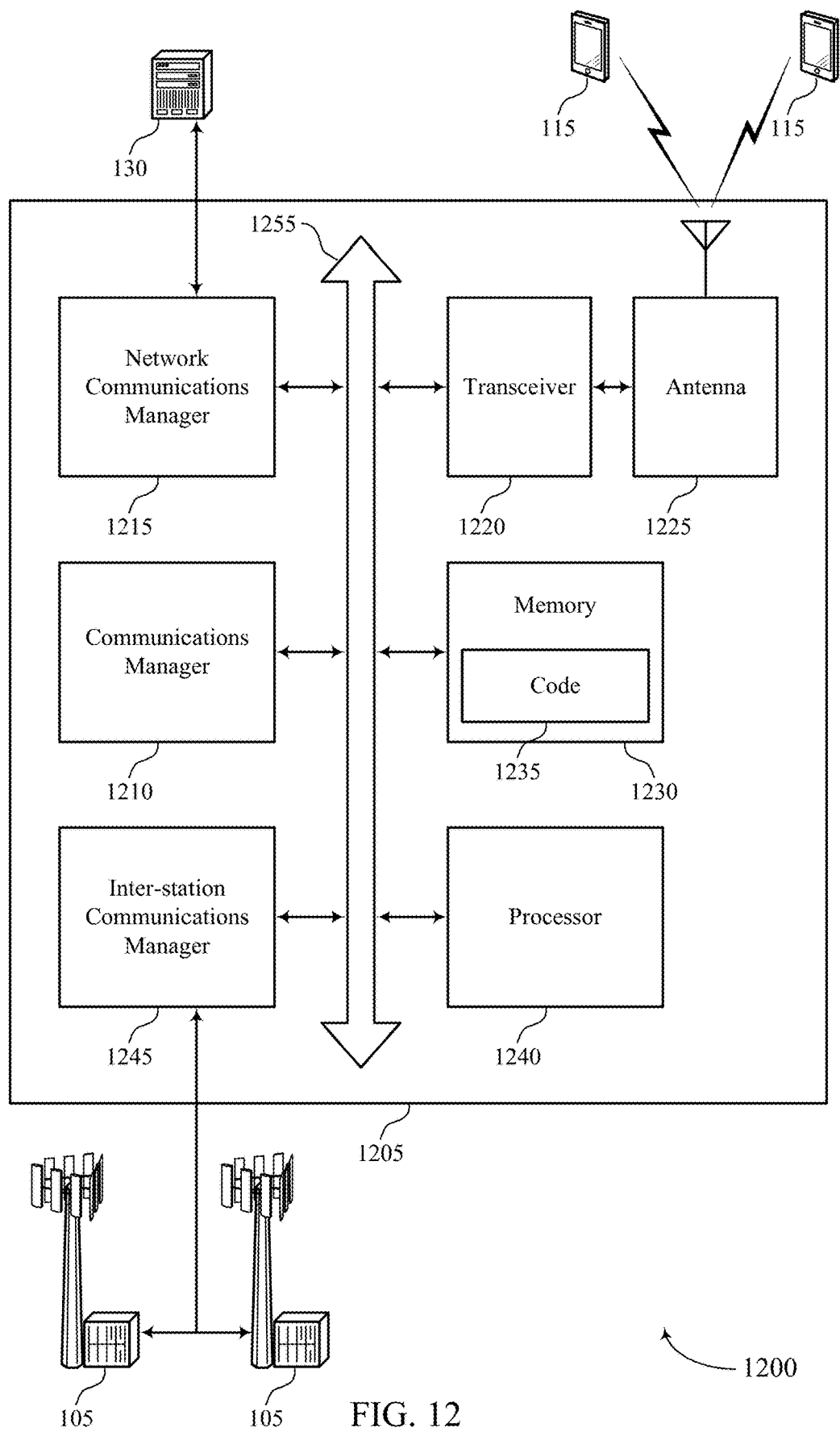
FIG. 12 shows a diagram of a system including a base station that supports cyclic prefix distribution in accordance with one or more aspects of the present disclosure.

FIG. 12 shows a diagram of a system 1200 including a device 1205 that supports cyclic prefix distribution in accordance with one or more aspects of the present disclosure. The device 1205 may be an example of or include the components of device 905 or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1255).

The communications manager 1210 may configure a subcarrier spacing for performing wireless communications, identify, for an initial slot of a periodic interval, a number of symbols included in the initial slot, a first length of a first set of cyclic prefixes used for a first set of symbols of the initial slot and a second length of a second set of cyclic prefixes used for a second set of symbols of the initial slot, where the first length of the first set of cyclic prefixes is based on a length of a cyclic prefix calculated for an initial symbol of the initial slot, where the calculated length of the cyclic prefix is different than the first length of the first set of cyclic prefixes and based on the subcarrier spacing, and communicate, using the initial slot, data based on the identified first set of cyclic prefixes and the identified second set of cyclic prefixes.

Network communications manager 1215 may manage communications with the core network (e.g., via one or more wired backhaul links). For example, the network communications manager 1215 may manage the transfer of data communications for client devices, such as one or more UEs 115.

Transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting cyclic prefix distribution).

Inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
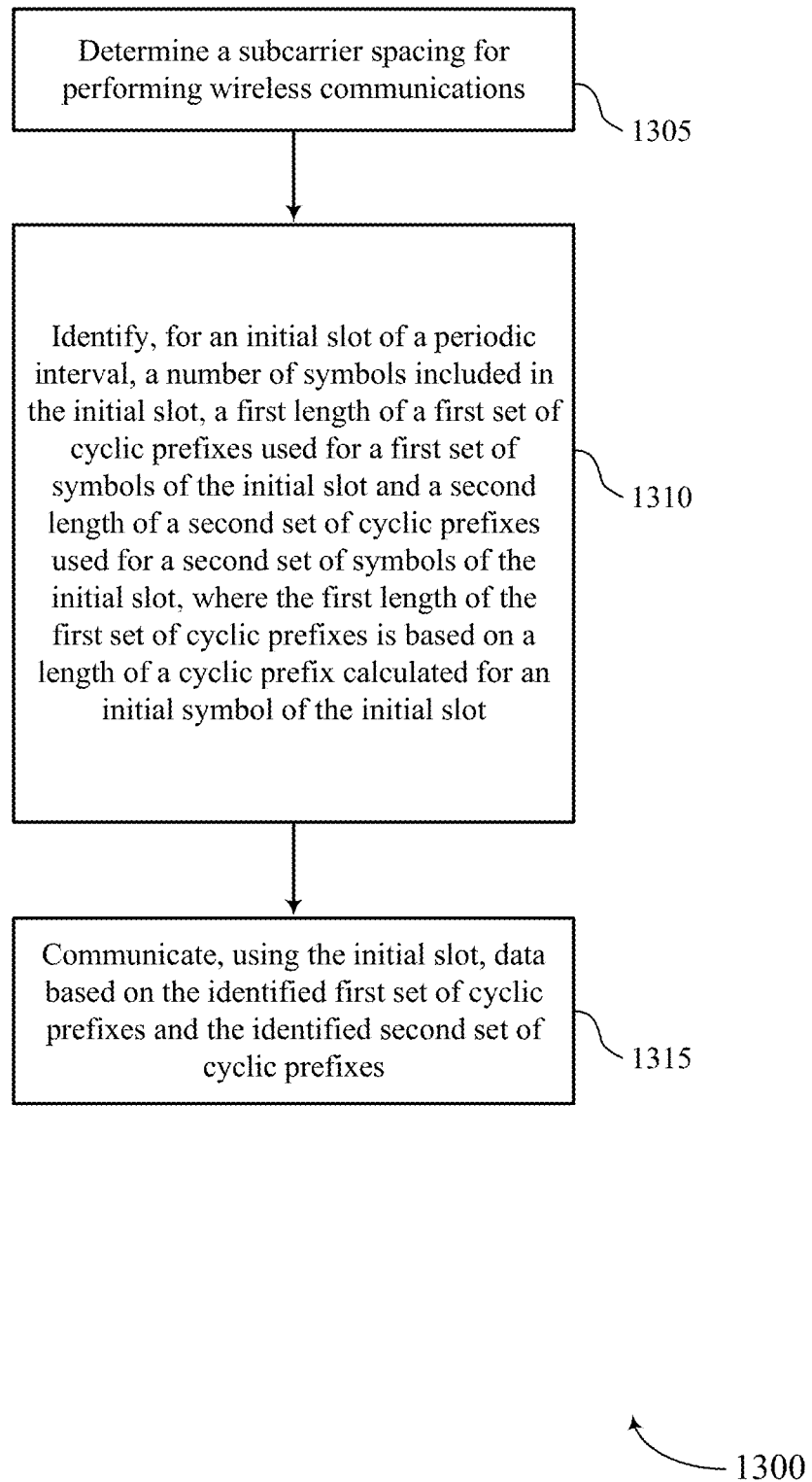
FIG. 13 shows a flowchart illustrating methods that support cyclic prefix distribution in accordance with one or more aspects of the present disclosure.

FIG. 13 shows a flowchart illustrating a method 1300 that supports cyclic prefix distribution in accordance with one or more aspects of the present disclosure. The operations of method 1300 may be implemented by a UE 115 or base station 105 or its components as described herein. For example, the operations of method 1300 may be performed by a communications manager as described with reference to FIGS. 9 through 12. In some examples, a UE or base station may execute a set of instructions to control the functional elements of the UE or base station to perform the functions described below. Additionally, or alternatively, a UE or base station may perform aspects of the functions described below using special-purpose hardware.

At 1305, the UE or base station may determine a subcarrier spacing for performing wireless communications. The operations of 1305 may be performed according to the methods described herein. In some examples, aspects of the operations of 1305 may be performed by a subcarrier configuration component as described with reference to FIGS. 9 through 12.

At 1310, the UE or base station may identify, for an initial slot of a periodic interval, a number of symbols included in the initial slot, a first length of a first set of cyclic prefixes used for a first set of symbols of the initial slot and a second length of a second set of cyclic prefixes used for a second set of symbols of the initial slot, where the first length of the first set of cyclic prefixes is based on a length of a cyclic prefix calculated for an initial symbol of the initial slot. The operations of 1310 may be performed according to the methods described herein. In some examples, aspects of the operations of 1310 may be performed by a resource configuration component as described with reference to FIGS. 9 through 12.

At 1315, the UE or base station may communicate, using the initial slot, data based on the identified first set of cyclic prefixes and the identified second set of cyclic prefixes. The operations of 1315 may be performed according to the methods described herein. In some examples, aspects of the operations of 1315 may be performed by a resource mapping component as described with reference to FIGS. 9 through 12.

Described below are a number of aspects, examples, or embodiments of methods, systems or apparatuses including means for implementing methods or realizing apparatuses, non-transitory computer-readable medium storing instructions executable by one or more processors to cause the one or more processors to implement methods, and systems including one or more processors and memory coupled with the one or more processors storing instructions executable by the one or more processors to cause the system or apparatus to implement methods. It is to be understood that these are just some aspects of possible embodiments, and other examples will be readily apparent to those skilled in the art without departing from the scope of the disclosure.

Aspect 1: A method for wireless communications at a device, comprising: determining a subcarrier spacing for performing wireless communications; identifying, for an initial slot of a periodic interval, a number of symbols included in the initial slot, a first length of a first set of cyclic prefixes used for a first set of symbols of the initial slot and a second length of a second set of cyclic prefixes used for a second set of symbols of the initial slot, wherein the first length of the first set of cyclic prefixes is based at least in part on a length of a cyclic prefix calculated for an initial symbol of the initial slot; and communicating, using the initial slot, data based at least in part on the identified number of symbols, the identified first set of cyclic prefixes, and the identified second set of cyclic prefixes.

Aspect 2: The method of aspect 1, where the calculated length of the cyclic prefix is different from the first length of the first set of cyclic prefixes and the calculated length is based at least in part on the subcarrier spacing.

Aspect 3: The method of aspects 1 or 2, wherein the second length of the second set of cyclic prefixes is equivalent to a third length of cyclic prefixes used for a third set of symbols of a second slot, the method further comprising: multiplexing a synchronization signal block with a symbol of the second set of symbols based at least in part on the second set of cyclic prefixes comprising the second length.

Aspect 4: The method of any of aspects 1 to 3, wherein the determining comprises: configuring the device with a subcarrier spacing for performing wireless communications.

Aspect 5: The method of any of aspects 1 to 4, further comprising: receiving an indication of a resource configuration that indicates the first length of the first set of cyclic prefixes, the second length of the second set of cyclic prefixes, and the number of symbols included in the initial slot.

Aspect 6: The method of any of aspects 1 to 5, further comprising: selecting a resource configuration based at least in part on the subcarrier spacing, wherein the resource configuration indicates the first length of the first set of cyclic prefixes for the initial slot and the second length of the second set of cyclic prefixes for the initial slot.

Aspect 7: The method of aspect 6, wherein the resource configuration indicates a third length of a third set of cyclic prefixes for a third set of symbols in a second set of slots of the periodic interval, wherein the second length of the second set of cyclic prefixes is equivalent to the third length of the third set of cyclic prefixes.

Aspect 8: The method of any of aspects 1 to 7, further comprising: indicating the first length of the first set of cyclic prefixes and the second length of the second set of cyclic prefixes based at least in part on the subcarrier spacing, wherein the indicating comprises transmitting an indication of a resource configuration for the subcarrier spacing, the resource configuration indicating the first length of the first set of cyclic prefixes and the second length of the second set of cyclic prefixes.

Aspect 9: The method of any of aspects 1 to 8, further comprising: allocating communication resources to a user equipment (UE) based at least in part on the first length of the first set of cyclic prefixes, the second length of the second set of cyclic prefixes, a first symbol length of the first set of symbols, and a second symbol length the second set of symbols, wherein the communicating comprises communicating the data over the allocated communication resources.

Aspect 10: The method of aspect 9, wherein a size of a resource allocation unit is based at least in part on a first relationship between the first length and the first symbol length and a second relationship between the second length and the second symbol length.

Aspect 11: The method of aspect 10, wherein the size of the resource allocation unit is further based at least in part on a size of a resource block.

Aspect 12: The method of aspect 11, wherein the resource allocation unit comprises a first number of resource elements, and wherein allocating the communication resources comprises allocating a number of resource blocks that comprises a second number of resource elements that is an integer multiple of the first number of resource elements.

Aspect 13: The method of aspect 9, wherein a size of a resource allocation unit is based at least in part on a half of a greater of: a first quotient of dividing the first symbol length by a first greatest common factor of the first length and the first symbol length; and a second quotient of dividing the second symbol length by a second greatest common factor of the second length and the second symbol length.

Aspect 14: The method of any of aspects 1 to 13, further comprising: identifying the periodic interval comprising the initial slot and a second set of slots; identifying, for the second set of slots, a third length of a third set of cyclic prefixes used for a third set of symbols; and identifying a first symbol length of the first set of symbols, a second symbol length of the second set of symbols, and a third symbol length of the third set of symbols, wherein the first symbol length, the second symbol length, and the third symbol length are equivalent to a symbol length.

Aspect 15: The method of aspect 14, wherein the calculated length of the cyclic prefix comprises the third length of the third set of cyclic prefixes and the symbol length based at least in part on the subcarrier spacing, the method further comprising: identifying the initial slot comprises an additional symbol relative to the second set of slots based at least in part on the calculated length of the cyclic prefix; identifying a fourth symbol length of the additional symbol that is equivalent to the symbol length; and identifying a fourth length of an additional cyclic prefix used for the additional symbol.

Aspect 16: The method of aspect 15, wherein the first length of the first set of cyclic prefixes is equivalent to a difference between the third length of the third set of cyclic prefixes and a quotient of dividing the fourth length of the additional cyclic prefix by a number of the first set of cyclic prefixes.

Aspect 17: The method of aspect 16, wherein the first set of cyclic prefixes comprises a plurality of cyclic prefixes, the first length of the first set of cyclic prefixes may be evenly divided into four portions, the second length of the second set of cyclic prefixes, the third length of the second set of cyclic prefixes, and the fourth length of the additional cyclic prefix are equivalent.

Aspect 18: The method of aspect 14, wherein the calculated length of the cyclic prefix comprises the third length of the third set of cyclic prefixes and multiple of the symbol length based at least in part on the subcarrier spacing, the method further comprising: identifying the initial slot comprises a plurality of additional symbols relative to the second set of slots based at least in part on the calculated length of the cyclic prefix; identifying a fourth symbol length of the plurality of additional symbols that is equivalent to the symbol length; and identifying a fourth length of a fourth set of cyclic prefixes used for the plurality of additional symbols.

Aspect 19: The method of aspect 18, wherein the first length of the first set of cyclic prefixes is equivalent to a difference between the third length of the third set of cyclic prefixes and a quotient of dividing a combined length of the fourth set of cyclic prefixes by a number of the first set of cyclic prefixes.

Aspect 20: The method of aspect 14, wherein the calculated length of the cyclic prefix comprises the third length of the third set of cyclic prefixes and a half of the symbol length based at least in part on the subcarrier spacing, the method further comprising: identifying the initial slot comprises a same number of symbols relative to the second set of slots based at least in part on the calculated length of the cyclic prefix.

Aspect 21: The method of aspect 20, wherein the first length of the first set of cyclic prefixes is equivalent to a summation of the third length of the third set of cyclic prefixes and a quotient of dividing the half of the symbol length by the number of the first set of cyclic prefixes.

Aspect 22: The method of aspect 14, wherein the calculated length of the cyclic prefix comprises the third length of the third set of cyclic prefixes and a half of the symbol length based at least in part on the subcarrier spacing, the method further comprising: identifying the initial slot comprises an additional half symbol relative to the second set of slots based at least in part on the calculated length of the cyclic prefix; identifying a fourth symbol length of the additional half symbol that is equivalent to half of the symbol length; and identifying a fourth length of an additional cyclic prefix used for the additional half symbol.

Aspect 23: The method of aspect 22, wherein the first length of the first set of cyclic prefixes is equivalent to a difference between the third length of the third set of cyclic prefixes and a quotient of dividing the fourth length of the additional cyclic prefix by a number of the first set of cyclic prefixes.

Aspect 24: The method of aspect 14, wherein the calculated length of the cyclic prefix comprises the third length of the third set of cyclic prefixes and a half of the symbol length based at least in part on the subcarrier spacing, the method further comprising: identifying the initial slot comprises an additional symbol relative to the second set of slots based at least in part on the calculated length of the cyclic prefix; identifying a fourth symbol length of the additional symbol that is equivalent to the symbol length; and identifying a fourth length of an additional cyclic prefix used for the additional symbol.

Aspect 25: The method of aspect 24, wherein a combined length of the first set of cyclic prefixes and the second set of cyclic prefixes is equivalent to a difference between a product of multiplying the third length of the third set of cyclic prefixes by a combined number of the first set of cyclic prefixes and the second set of cyclic prefixes and a summation of the half of the symbol length and the fourth length of the additional cyclic prefix.

Aspect 26: The method of any of aspects 1 to 25, wherein the first length of the first set of cyclic prefixes and the second length of the second set of cyclic prefixes is based at least in part on a distribution of the calculated length of the cyclic prefix across the initial slot.

Aspect 27: The method of any of aspects 1 to 26, further comprising: configuring the device with a frequency band.

Aspect 28: The method of any of aspects 1 to 27, wherein the device is a user equipment or a base station.

Aspect 29: An apparatus for wireless communication comprising at least one means for performing a method of any one of aspects 1 through 28.

Aspect 30: An apparatus for wireless communication comprising a processor and memory coupled to the processor, the processor and memory configured to perform a method of any one of aspects 1 through 28.

Aspect 31: A non-transitory computer-readable medium storing code for wireless communication, the code comprising instructions executable by a processor to perform a method of any one of aspects 1 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a device, comprising:
   determining a subcarrier spacing for performing the wireless communications;
   identifying, for an initial slot of a periodic interval, a number of symbols included in the initial slot, the number of symbols included in the initial slot of the periodic interval being greater than a number of symbols included in a second slot of the periodic interval, wherein the second slot is subsequent to the initial slot and the initial slot is a first slot in a time domain of the periodic interval, and wherein the number of symbols included in the initial slot is based at least in part on the subcarrier spacing;
   modifying, based at least in part on the number of symbols included in the initial slot, a first length of a first set of cyclic prefixes used for a first set of symbols of the initial slot and a second length of a second set of cyclic prefixes used for a second set of symbols of the initial slot, wherein the first length of the first set of cyclic prefixes is based at least in part on a length of a cyclic prefix calculated for an initial symbol of the initial slot; and
   communicating, using the initial slot, data based at least in part on the identified number of symbols, the identified first set of cyclic prefixes, and the identified second set of cyclic prefixes.

2. The method of claim 1, wherein the calculated length of the cyclic prefix is different from the first length of the first set of cyclic prefixes and the calculated length is based at least in part on the subcarrier spacing.

3. The method of claim 1, wherein the second length of the second set of cyclic prefixes is equivalent to a third length of cyclic prefixes used for a third set of symbols of the second slot, the method further comprising:
   multiplexing a synchronization signal block with a symbol of the second set of symbols based at least in part on the second set of cyclic prefixes comprising the second length.

4. The method of claim 1, wherein the determining comprises:
   configuring the device with the subcarrier spacing for performing the wireless communications.

5. The method of claim 1, further comprising:
   receiving an indication of a resource configuration that indicates the first length of the first set of cyclic prefixes, the second length of the second set of cyclic prefixes, and the number of symbols included in the initial slot.

6. The method of claim 1, further comprising:
   selecting a resource configuration based at least in part on the subcarrier spacing, wherein the resource configuration indicates the first length of the first set of cyclic prefixes for the initial slot and the second length of the second set of cyclic prefixes for the initial slot.

7. The method of claim 6, wherein the resource configuration indicates a third length of a third set of cyclic prefixes for a third set of symbols in a second set of slots of the periodic interval, wherein the second length of the second set of cyclic prefixes is equivalent to the third length of the third set of cyclic prefixes.

8. The method of claim 1, further comprising:
   indicating the first length of the first set of cyclic prefixes and the second length of the second set of cyclic prefixes based at least in part on the subcarrier spacing, wherein the indicating comprises transmitting an indication of a resource configuration for the subcarrier spacing, the resource configuration indicating the first length of the first set of cyclic prefixes and the second length of the second set of cyclic prefixes.

9. The method of claim 1, further comprising:
   allocating communication resources to a user equipment (UE) based at least in part on the first length of the first set of cyclic prefixes, the second length of the second set of cyclic prefixes, a first symbol length of the first set of symbols, and a second symbol length the second set of symbols, wherein the communicating comprises communicating the data over the allocated communication resources.

10. The method of claim 9, wherein a size of a resource allocation unit is based at least in part on a first relationship between the first length and the first symbol length and a second relationship between the second length and the second symbol length.

11. The method of claim 10, wherein the size of the resource allocation unit is further based at least in part on a size of a resource block.

12. The method of claim 11, wherein the resource allocation unit comprises a first number of resource elements, and wherein allocating the communication resources comprises allocating a number of resource blocks that comprises a second number of resource elements that is an integer multiple of the first number of resource elements.

13. The method of claim 9, wherein a size of a resource allocation unit is based at least in part on a half of a greater of:
   a first quotient of dividing the first symbol length by a first greatest common factor of the first length and the first symbol length; and
   a second quotient of dividing the second symbol length by a second greatest common factor of the second length and the second symbol length.

14. The method of claim 1, wherein the first length of the first set of cyclic prefixes and the second length of the second set of cyclic prefixes is based at least in part on a distribution of the calculated length of the cyclic prefix across the initial slot.

15. The method of claim 1, further comprising:
   configuring the device with a frequency band.

16. The method of claim 1, wherein the device is a user equipment or a network device.

17. An apparatus for wireless communication, comprising:
   one or more processors; and
   memory coupled to the one or more processors, the one or more processors configured individually or collectively to cause the apparatus to:
      determine a subcarrier spacing for performing wireless communications;
      identify, for an initial slot of a periodic interval, a number of symbols included in the initial slot, the number of symbols included in the initial slot of the periodic interval being greater than a number of symbols included in a second slot of the periodic interval, wherein the second slot is subsequent to the initial slot and the initial slot is a first slot in a time domain of the periodic interval, wherein the number of symbols included in the initial slot is based at least in part on the subcarrier spacing;
      modify, based at least in part on the number of symbols included in the initial slot, a first length of a first set of cyclic prefixes used for a first set of symbols of the initial slot and a second length of a second set of cyclic prefixes used for a second set of symbols of the initial slot, wherein the first length of the first set of cyclic prefixes is based at least in part on a length of a cyclic prefix calculated for an initial symbol of the initial slot; and communicate, using the initial slot, data based at least in part on the identified number of symbols, the identified first set of cyclic prefixes, and the identified second set of cyclic prefixes.

18. The apparatus of claim 17, wherein the calculated length of the cyclic prefix is different from the first length of the first set of cyclic prefixes and based at least in part on the subcarrier spacing.

19. The apparatus of claim 17, wherein the second length of the second set of cyclic prefixes is equivalent to a third length of cyclic prefixes used for a third set of symbols of the second slot, and wherein the one or more processors are further configured individually or collectively to cause the apparatus to:

multiplex a synchronization signal block with a symbol of the second set of symbols based at least in part on the second set of cyclic prefixes comprising the second length.

20. The apparatus of claim 17, wherein, to determine the subcarrier spacing, the one or more processors are configured individually or collectively to cause the apparatus to:

configure the apparatus with the subcarrier spacing for performing the wireless communications.

21. The apparatus of claim 17, wherein the one or more processors are further configured individually or collectively to cause the apparatus to:

receive an indication of a resource configuration that indicates the first length of the first set of cyclic prefixes, the second length of the second set of cyclic prefixes, and the number of symbols included in the initial slot.

22. The apparatus of claim 17, wherein the one or more processors are further configured individually or collectively to cause the apparatus to:

select a resource configuration based at least in part on the subcarrier spacing, wherein the resource configuration indicates the first length of the first set of cyclic prefixes for the initial slot and the second length of the second set of cyclic prefixes for the initial slot.

23. The apparatus of claim 22, wherein the resource configuration indicates a third length of a third set of cyclic prefixes for a third set of symbols in a second set of slots of the periodic interval, wherein the second length of the second set of cyclic prefixes is equivalent to the third length of the third set of cyclic prefixes.

24. The apparatus of claim 17, wherein the one or more processors are further configured individually or collectively to cause the apparatus to:

indicating the first length of the first set of cyclic prefixes and the second length of the second set of cyclic prefixes based at least in part on the subcarrier spacing, wherein the indicating comprises transmitting an indication of a resource configuration for the subcarrier spacing, the resource configuration indicating the first length of the first set of cyclic prefixes and the second length of the second set of cyclic prefixes.

25. The apparatus of claim 17, wherein the one or more processors are further configured individually or collectively to cause the apparatus to:

allocating communication resources to a user equipment (UE) based at least in part on the first length of the first set of cyclic prefixes, the second length of the second set of cyclic prefixes, a first symbol length of the first set of symbols, and a second symbol length the second set of symbols, wherein the communicating comprises communicating the data over the allocated communication resources.

26. The apparatus of claim 25, wherein a size of a resource allocation unit is based at least in part on a first relationship between the first length and the first symbol length and a second relationship between the second length and the second symbol length.

27. The apparatus of claim 26, wherein the size of the resource allocation unit is further based at least in part on a size of a resource block.

28. The apparatus of claim 27, wherein the resource allocation unit comprises a first number of resource elements, and wherein allocating the communication resources comprises allocating a number of resource blocks that comprises a second number of resource elements that is an integer multiple of the first number of resource elements.

29. A non-transitory computer-readable medium storing code for wireless communications at a device, the code comprising instructions executable by one or more processors to:

determine a subcarrier spacing for performing the wireless communications;

identify, for an initial slot of a periodic interval, a number of symbols included in the initial slot, the number of symbols included in the initial slot of the periodic interval being greater than a number of symbols included in a second slot of the periodic interval, wherein the second slot is subsequent to the initial slot and the initial slot is a first slot in a time domain of the periodic interval, wherein the number of symbols included in the initial slot is based at least in part on the subcarrier spacing;

modify, based at least in part on the number of symbols included in the initial slot, a first length of a first set of cyclic prefixes used for a first set of symbols of the initial slot and a second length of a second set of cyclic prefixes used for a second set of symbols of the initial slot, wherein the first length of the first set of cyclic prefixes is based at least in part on a length of a cyclic prefix calculated for an initial symbol of the initial slot; and communicate, using the initial slot, data based at least in part on the identified number of symbols, the identified first set of cyclic prefixes, and the identified second set of cyclic prefixes.

30. An apparatus for wireless communications at a device, comprising:

means for determining a subcarrier spacing for performing the wireless communications;

means for identifying, for an initial slot of a periodic interval, a number of symbols included in the initial slot, the number of symbols included in the initial slot of the periodic interval being greater than a number of symbols included in a second slot of the periodic interval, wherein the second slot is subsequent to the initial slot and the initial slot is a first slot in a time domain of the periodic interval, wherein the number of symbols included in the initial slot is based at least in part on the subcarrier spacing;

means for modifying, based at least in part on the number of symbols included in the initial slot, a first length of a first set of cyclic prefixes used for a first set of symbols of the initial slot and a second length of a second set of cyclic prefixes used for a second set of symbols of the initial slot, wherein the first length of the first set of cyclic prefixes is based at least in part on a length of a cyclic prefix calculated for an initial symbol of the initial slot; and means for communicating, using the initial slot, data based at least in part on the identified number of symbols, the identified first set of cyclic prefixes, and the identified second set of cyclic prefixes.

* * * * *